US009763094B2

(12) United States Patent
Thelen et al.

(10) Patent No.: US 9,763,094 B2
(45) Date of Patent: Sep. 12, 2017

(54) METHODS, DEVICES AND SYSTEMS FOR DYNAMIC NETWORK ACCESS ADMINISTRATION

(71) Applicant: QUALCOMM Incorporated, San Diego, CA (US)

(72) Inventors: Christian Oliver Thelen, San Diego, CA (US); Ted Ray Gooding, San Diego, CA (US); Robert Sean Daley, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 14/170,474

(22) Filed: Jan. 31, 2014

(65) Prior Publication Data

US 2015/0223068 A1 Aug. 6, 2015

(51) Int. Cl.
| | |
|---|---|
| *G06F 21/00* | (2013.01) |
| *H04W 12/08* | (2009.01) |
| *H04L 29/06* | (2006.01) |
| *H04W 12/06* | (2009.01) |
| *H04W 84/12* | (2009.01) |

(52) U.S. Cl.
CPC ............ *H04W 12/08* (2013.01); *H04L 63/06* (2013.01); *H04L 63/08* (2013.01); *H04L 63/083* (2013.01); *H04L 63/0876* (2013.01); *H04W 12/06* (2013.01); *H04W 84/12* (2013.01)

(58) Field of Classification Search
CPC .... H04W 12/08; H04W 12/06; H04L 63/083; H04L 63/0876
See application file for complete search history.

(56) References Cited

U.S. PATENT DOCUMENTS

| | | | | |
|---|---|---|---|---|
| 7,535,880 | B1 * | 5/2009 | Hinman et al. | 370/338 |
| 7,874,006 | B2 * | 1/2011 | Hassan et al. | 726/26 |
| 7,874,007 | B2 * | 1/2011 | Hassan | H04L 63/104 |
| | | | | 713/153 |
| 7,882,557 | B2 * | 2/2011 | Coskun | H04L 63/0272 |
| | | | | 726/15 |

(Continued)

OTHER PUBLICATIONS

Ameter C.R., et al., "WHIFF—Wireless Intrustion Detection System," Foundstone, Inc., 2003, 25 Pages.

(Continued)

*Primary Examiner* — Sharon Lynch
(74) *Attorney, Agent, or Firm* — Loza & Loza LLP

(57) ABSTRACT

Methods and devices for providing access to a wireless network through a network access point secured with a network password may include receiving a request to provide access to the wireless network for a device on the network access point. A virtual access point may be established to provide access to the wireless network for the device in response to receiving the request to provide access for the device on the network access point. A virtual access point password may be established for the device and associated with a unique identifier of the device. The virtual access point password may be different from the network password. The device may be provided with access to the network when an entered password matches the virtual access point password and the device identifier matches the unique identifier of the device associated with the virtual access point password.

30 Claims, 11 Drawing Sheets

(56) References Cited

U.S. PATENT DOCUMENTS

| | | | | |
|---|---|---|---|---|
| 8,112,797 | B2* | 2/2012 | Coskun | H04L 63/0272 709/229 |
| 8,428,036 | B2 | 4/2013 | Herscovici et al. | |
| 8,631,471 | B2* | 1/2014 | Dattagupta et al. | 726/4 |
| 8,776,187 | B2* | 7/2014 | Hassan | H04L 63/104 705/76 |
| 8,782,764 | B2* | 7/2014 | Coskun | H04L 63/0272 726/8 |
| 8,812,670 | B2* | 8/2014 | Haddad et al. | 709/225 |
| 8,943,570 | B1* | 1/2015 | Kalbag | 726/8 |
| 9,009,310 | B1* | 4/2015 | DeRosia | H04L 12/1464 709/225 |
| 9,172,695 | B2* | 10/2015 | Coskun | H04L 63/0272 |
| 9,553,846 | B2* | 1/2017 | Gu | H04L 12/4633 |
| 2002/0146002 | A1 | 10/2002 | Sato | |
| 2003/0079029 | A1* | 4/2003 | Garimella | G06F 21/31 709/229 |
| 2004/0078598 | A1 | 4/2004 | Barber et al. | |
| 2005/0136892 | A1* | 6/2005 | Oesterling | H04L 63/08 455/411 |
| 2006/0046730 | A1* | 3/2006 | Briancon | H04W 16/28 455/446 |
| 2006/0094400 | A1* | 5/2006 | Beachem et al. | 455/410 |
| 2006/0149967 | A1* | 7/2006 | Lee et al. | 713/168 |
| 2006/0165103 | A1* | 7/2006 | Trudeau et al. | 370/401 |
| 2007/0255837 | A1* | 11/2007 | Hassan et al. | 709/227 |
| 2007/0255838 | A1* | 11/2007 | Hassan | H04L 63/104 709/227 |
| 2007/0256121 | A1* | 11/2007 | Hassan | H04L 63/104 726/5 |
| 2008/0155685 | A1* | 6/2008 | Beilinson et al. | 726/21 |
| 2010/0058446 | A1* | 3/2010 | Thwaites | 726/4 |
| 2010/0106966 | A1 | 4/2010 | Santos et al. | |
| 2011/0055900 | A1* | 3/2011 | Chua et al. | 726/4 |
| 2012/0184242 | A1* | 7/2012 | Li et al. | 455/406 |
| 2012/0209934 | A1* | 8/2012 | Smedman | 709/208 |
| 2012/0317619 | A1* | 12/2012 | Dattagupta et al. | 726/4 |
| 2013/0029767 | A1* | 1/2013 | Boutin | A63F 13/71 463/42 |
| 2013/0039213 | A1* | 2/2013 | Averbuch | H04L 67/34 370/254 |
| 2013/0064132 | A1* | 3/2013 | Low | H04W 24/02 370/254 |
| 2013/0111554 | A1 | 5/2013 | Sposato et al. | |
| 2013/0170432 | A1* | 7/2013 | O'Brien | H04W 4/06 370/328 |
| 2013/0305320 | A1* | 11/2013 | Warrick | H04L 61/103 726/4 |
| 2013/0318587 | A1 | 11/2013 | Shamsspoor | |
| 2014/0036893 | A1* | 2/2014 | Bhanage et al. | 370/338 |
| 2014/0127994 | A1* | 5/2014 | Nightingale et al. | 455/41.1 |
| 2014/0304796 | A1* | 10/2014 | Hassan | H04L 63/104 726/9 |
| 2015/0067792 | A1* | 3/2015 | Benoit | H04W 12/04 726/5 |
| 2015/0221005 | A1* | 8/2015 | DeRosia | H04L 12/1464 705/26.35 |
| 2015/0365421 | A1* | 12/2015 | Warrick | H04L 61/103 726/4 |
| 2016/0099918 | A1* | 4/2016 | Coskun | H04L 63/0272 726/15 |
| 2016/0292799 | A1* | 10/2016 | DeRosia | H04L 12/1464 |

OTHER PUBLICATIONS

International Search Report and Written Opinion—PCT/US2015/013102—ISA/EPO—May 4, 2015.

* cited by examiner

| VIRTUAL ACCESS POINT TABLE | | | | | | |
|---|---|---|---|---|---|---|
| INDEX | VIRTUAL NAME | ACTIVITY | STATE | TIME RESTRICTIONS | ACCESS RESTRICTIONS | BANDWIDTH RESTRICTIONS | DEVICE ID(s) |
| 1 | NEIGHBORS | ACTIVE | OPEN | 8 AM - 11 PM | EXTERNAL ONLY | BW LVL 5 | ??:??:??:??:??:?? |
| 2 | JOHNSNET | IDLE | BOUND | 8 AM - 11 PM | EXTERNAL ONLY | BW LVL 1 | 12:34:56:78:9A:02 |
| 3 | PARENTS | ACTIVE | BOUND | NO RESTRICTIONS | NO RESTRICTIONS | FULL BW LVL 10 | 12:34:56:78:9A:00 12:34:56:78:9A:01 |
| 4 | KIDS | ACTIVE | BOUND | 3 PM - 8 PM | NO RESTRICTIONS | BW LVL 8 | 12:34:56:78:9A:04 12:34:56:78:9A:05 |
| 5 | JANESNET | IDLE | BOUND | NO RESTRICTIONS | NO RESTRICTIONS | BW LVL 7 | 12:34:56:78:9A:03 |

FIG. 3A

| MAC ADDRESS USER TABLE | | |
|---|---|---|
| DEVICE ID (MAC ADDRESS) | VIRTUAL ACCESS POINT INDEX | NAME |
| 12:34:56:78:9A:00 | 3 | MOM |
| 12:34:56:78:9A:01 | 3 | DAD |
| 12:34:56:78:9A:02 | 2 | JOHN DOE |
| 12:34:56:78:9A:04 | 4 | BOBBY PHONE |
| 12:34:56:78:9A:05 | 4 | BOBBY LAPTOP |
| ??:??:??:??:??:?? | 1 | DALE NEIGHBOR |
| 12:34:56:78:9A:03 | 5 | JANE |

FIG. 3B

METHODS, DEVICES AND SYSTEMS FOR DYNAMIC NETWORK ACCESS ADMINISTRATION

BACKGROUND

Conventional wireless network access points (APs), routers, bridges, or similar access devices, provide one or more clients with access to wireless networks (e.g., WiFi networks) configured according to various standards or protocols (e.g., 802.11a, 802.11g, etc.). A network access point may provide a computing device with access to other nodes on the network, such as computing and peripheral devices that are connected to a home network. A network access point may further provide the communication device with access to the Internet, such as through a service provider associated with the network access point.

A network access point may be configured for open access or shared key access. For open access networks, a communication device may freely gain access to the network through the network access point by discovering or knowing the name or service set identifier (SSID) of the network. In an open access network, the communication device may associate with the network access point and access the network directly without entering a password. For a network access point configured for open access, any client within wireless range may gain access to the network by sending a connect request to the network access point, for example using the SSID for the network access point or network. The network access point will generally allow association with the network in an open access operational mode.

In a shared key network, a communication device may gain access to the network through the network access point only after successfully submitting the shared key or password. If the network access point confirms that the submitted key or password is correct, the communication device is granted access to the network. For access points configured for shared key access, the wireless communication link between the network access point and the communication device may be encrypted with a password or encryption key, which the client may enter when initially connecting to the network access point and network or at a later time using a stored version of the key. In a shared key access configuration mode, packets or frames that are sent between the network access point and the communication device may be encrypted and decrypted using the shared key. Thus, in order for the network access point to process the packets or frames received from the communication device, the communication device must have used the correct encryption key.

When a new network access point device is installed, it may be configured for shared key access by setting a password, which is generally a single password representing the shared key. The person assigning the password may act as the "administrator" of the network access point and thus the network. Because only a single key is used for access, any device that attempts to gain access to the network through the network access point using the single key may be granted access. Because the password is not associated with any particular accessing device, the number of devices that could potentially access the network is limited only by the ability to control the distribution of the shared key or password. Thus, anyone knowing the password can gain access to the network by correctly entering the password during an access procedure between the device and the network access point, regardless of the communication device they are using.

Security vulnerabilities may arise, however, when distributing passwords to guests who require network access. Presently, one of the only options for providing guest access is to provide guests with the network password. Since, by design, there is no association between the password and any particular device, the guest may give the password to others who may then access the network with their devices. Thus, when the password is distributed to even one person other than the administrator, there is a risk of unintentional disclosures of the password. When the password becomes widely distributed, access control and network security may become compromised.

To address this security risk, system administrators may periodically change the password. However, the new password must be re-distributed to legitimate or desired guests and the cycle of unintentional distribution of the password and potential compromising of security may be repeated. Other options to avoid divulging the main access point password may involve setting up a guest account or accounts with a guest password. Such a process can be costly, complex, unreliable and time consuming, as the configuration of the network access point hardware to support additional service set identifiers (SSIDs) or the use of additional network access points may be necessary. Even if a separate guest access is established, the same problem arises with regard to the guest accounts, because the guest password may be given out to others who may then gain access to the network.

SUMMARY

Various embodiments include methods and devices directed to providing access to a wireless network through a network access point secured with a network password. An embodiment method may include receiving a request to provide access to the wireless network for a guest device on the network access point, establishing a virtual access point to provide access to the wireless network for the guest device in response to receiving the request to provide access for the guest device on the network access point, establishing a virtual access point password different from the network password for the guest device associated with a unique device identifier of the guest device, and providing the guest device with access to the network when an entered password matches the virtual access point password and a guest device identifier of the guest device matches the unique device identifier of the guest device associated with the virtual access point password.

In an embodiment method, the received request includes information associated with the guest device. An embodiment method may further include establishing a virtual access point password for the guest device by establishing the virtual access point password for the guest device associated with a virtual identifier of the guest device based on the information associated with the guest device. An embodiment method may further include providing the guest device with access to the network by providing access to the network during a first access attempt when an entered password matches the virtual access point password and the information associated with the guest device matches the virtual identifier of the guest device associated with the virtual access point password.

An embodiment method may further include establishing a virtual access point identifier associated with the virtual access point, providing the virtual access point identifier and the virtual access point password to the guest device, storing the virtual access point identifier and the virtual access point password in a database accessible to the virtual access point, obtaining the unique device identifier of the guest device during the first access attempt by the guest device using the virtual access point identifier and the virtual access point password, and storing the unique device identifier of the guest device in association with the virtual access point identifier and the virtual access point password in the database accessible to the virtual access point. In a further embodiment method, when the unique identifier has been obtained, providing the guest device with access to the network may include providing the guest device with access to the network in subsequent access attempts when the guest device accesses the virtual access point using the virtual access point identifier, when an entered password matches the virtual access point password and when a guest device identifier of the guest device matches the unique device identifier of the guest device that is stored in association with the virtual access point password. In a further embodiment method, the unique identifier of the guest device may include a medium access control (MAC) address of the guest device.

In a further embodiment method, establishing a virtual access point password for the guest device associated with the virtual identifier of the guest device may include receiving in the network access point a password from a second guest device for which access has not been requested and obtaining information associated with the second guest device in an access attempt, determining whether the received password received from the second guest device matches one of: the network password of the network access point and the virtual access point password, informing an administrator of the network about the second guest device access attempt in response to recognizing that the password received from the second guest device does not match the one of: the network password of the network access point and the virtual access point password, receiving in the network access point a message from the network administrator requesting the network access point to provide the second guest device with access to the network, establishing a second virtual access point password for the second guest device associated with a second virtual identifier of the second guest device based on the information associated with the second guest device, wherein the second virtual access point password is different from the network password and storing the established second virtual access point password for the second guest device in a data record including the second virtual identifier of the second guest device. In a further embodiment method, establishing a virtual access point to provide access to the wireless network for the guest device in response to receiving the request to provide access for the guest device on the network access point may include establishing the virtual access point when the information associated the guest device matches the virtual identifier of the guest device during the first access attempt; and establishing the virtual access point when the guest device identifier matches the unique device identifier of the guest device stored in association with the virtual access point password during subsequent access attempts after the first access attempt.

In a further embodiment method, establishing a virtual access point may include determining whether a limit of available virtual access points has been reached, and establishing a virtual access point may include establishing the virtual access point with the virtual access point identifier in response to determining that a limit of available virtual access points has not been reached. In a further embodiment method, establishing a virtual access point may include establishing a restriction on access to the wireless network for the guest device, and providing the guest device with access to the network in subsequent access attempts when an entered password matches the virtual access point password and the guest device identifier matches the unique device identifier of the guest device stored in association with the virtual access point password may include providing the guest device with access to the network subject to the restriction when an entered password matches the virtual access point password and the guest device identifier matches the unique device identifier of the guest device stored in association with the virtual access point password.

Further embodiments include an apparatus having a processor or processors configured with processor-executable instructions to perform operations of the methods described above. Further embodiments include an apparatus having means for performing functions of the methods described above. Further embodiments include a non-transitory processor-readable storage medium on which is stored processor-executable instructions configured to cause a processor to perform operations of the methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 3A is a table illustrating virtual access point table parameters suitable for use with the various embodiments.

FIG. 3B is a table illustrating media access control (MAC) address user table parameters suitable for use with the various embodiments.

DETAILED DESCRIPTION

Figure 1A:
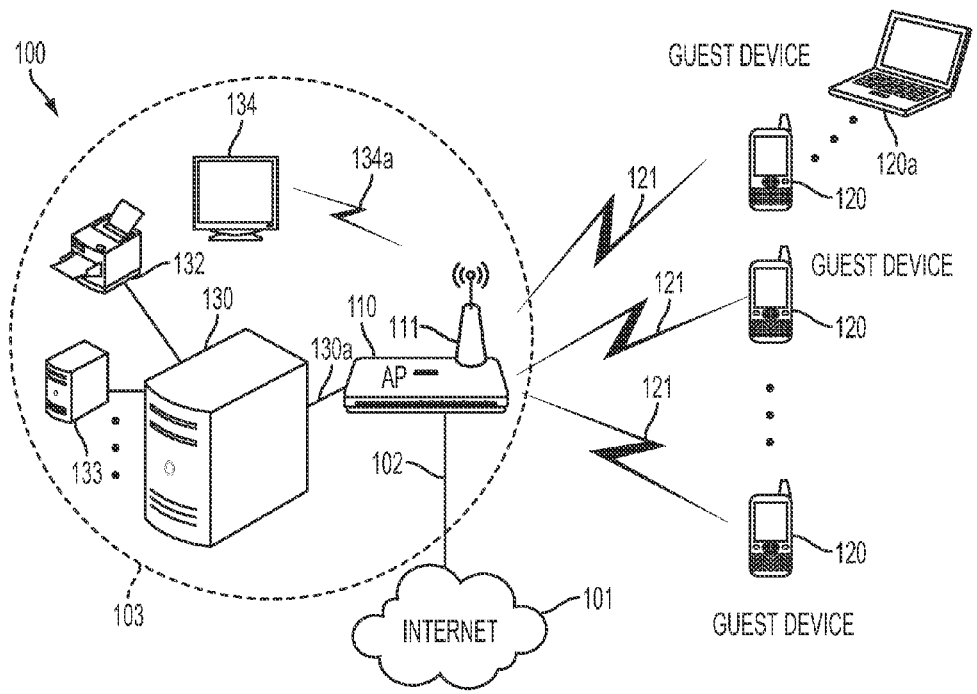
FIG. 1A is a communication system block diagram illustrating an example communication network including a network, an access point, and accessing devices.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The terms "device," "computing device," "guest device," "network administrator device" as used herein, may refer to any one or all of cellular telephones, smartphones, personal or mobile multi-media players, personal data assistants (PDA's), laptop computers, desktop computers, tablet computers, smart books, palm-top computers, wireless electronic mail receivers, multimedia Internet enabled cellular telephones, televisions, smart TVs, smart TV set-top buddy boxes, integrated smart TVs, streaming media players, smart cable boxes, set-top boxes, digital video recorders (DVR), digital media players, and similar personal electronic devices which include a programmable processor, especially those that include an SoC.

The term "access point" ("AP" in the figures) as used herein refers to any one or all of wireless access points, wireless routers, wireless access point repeaters, wireless access point range extenders, bridges, combinations of these device or other devices that provide access for a client to a network operating according to a wireless protocol, such as a WiFi protocol (e.g. under various versions of the 802.11 protocol), including a password-based security authentication configuration. Access points may also provide further access to private networks and/or to a service provider for accessing a public network such as the Internet, or a combination of public and private networks. Access points are described herein as being wireless, and providing wireless access to a local area network (LAN) or wireless LAN (WLAN), such as a home or private local area network. However, access points may also support wired connections to networks.

As used herein the terms "communication device" and "device" refer to any type of computing or communication device having network access circuitry, such as a wireless network transceiver (e.g., a WiFi transceiver), configured to communicate with an access point. Some non-limiting examples of communication devices include smartphones, laptop computers, tablet computers, network-enabled televisions, and wireless-enabled appliances. As used herein, the term "guest device" refers to a communication device connecting or attempting to connect to an access point without the proper password, such a computing device of a user who does not know the network access point password. As used herein, the term "network administrator device" refers to a communication device that may be used by an administrator or owner of an access point.

When a communication device attempts to access a conventional secured wireless network through an access point without the proper password the network access point will deny access to the network. A network administrator, who may be the owner of the wireless network, may provide the network key or password to guests to whom the network administrator wishes to provide access. However, as mentioned above, providing the password to guests increases the risk that the network may become compromised.

Such problems may be overcome by the various embodiments that provide a guest device that is approved by an administrator with access to a secured wireless network by way of a virtual access point using a virtual access point password entered by the guest and a device specific identifier of the approved guest device. A virtual access point may be established or instantiated by a network access point based on a request sent by an administrator, for example. Such a virtual access point may enable a guest to gain access to a wireless network secured using a network access point configured for secured access through a shared key or password without disclosing that key or password to the guest. Instead, an identifier for the virtual access point and a dedicated virtual access point password may be established for the guest device based on information that limits the use of the virtual access point password and the virtual access point identified by the virtual access point identifier to the guest device via its MAC or other unique identifier. In this manner, network security is maintained because the virtual access point password used by the guest is useless to other communication devices, thereby eliminating the risk of wide distribution of the virtual access point password.

In an embodiment, a guest device may attempt access without a request having been previously made by the network administrator. In this situation, when the guest device attempts to access the network access point by entering a password that does not match the proper password of the network or does not match a virtual access point password, the guest access attempt may function as a request or cause a request to be made by a network administrator. Information about the access attempt by the guest device, including information about the guest device that can assist the network administrator in recognizing the device or device user, may be captured by the network access point and forwarded to the network administrator. The information may alternatively be provided or supplemented by the guest device based on a query from the network access point and then forwarded to the network administrator.

When the network administrator approves the request, the approval may be sent to the network access point. The approval may cause the a virtual access point and virtual access point password to be established as described herein or the virtual access point may be established later during discovery. In other words, the first time the guest device attempts to access the network with the non-matching password, the network access point will not recognize the password, and so may inform the network administrator and inquire whether the guest device should be permitted access.

If the network administrator approves access, such as by pressing a virtual key on a user interface displayed on the network administrator's device, this approval is communicated to the network access point possibly with additional information about the guest device. In this way, the guest access attempt functions to cause the request to be made. In response to the request, the network access point may create a virtual access point and virtual access point password based on the request and identifying information for the guest device. When the guest receives the virtual access point password and virtual access point identifier in a subsequent message, a subsequent access attempt may be made using the established virtual access point password. When the subsequent access attempt is made with the correct virtual access point password and the information about the guest device, a unique identifier of the guest device may be obtained and bound with the virtual access point password as further described herein.

Non-limiting examples of a device identifier uniquely associated with the guest device include a MAC address, IMEI number, IMSI number, or other unique hardware based identifier. In other words, the device identifier may be bound with the virtual access point password in a database accessible to the virtual access point. Thereafter, the guest may access the network by entering the virtual access point password from the same communication device. When the virtual access point receives a password that matches a virtual access point password, it determines whether the device ID of the accessing communication device (i.e., the guest device) matches the device ID associated with the virtual access point password; if so the guest device is permitted access to the network, and if not, network access is denied.

By limiting network access to guests entering an approved virtual access point password from a guest device having a device identifier unique to the approved guest device only the particular guest device associated with the device identifier, and using the correct virtual access point password may be given access to the virtual access point. Even if the virtual access point password is disclosed to a third party, the third party will not be able to gain access to the network with a third party communication device because the device identifier of the third party communication device will not match the device identifier of the guest device that can use the virtual access point password. Thus, inadvertent or deliberate distribution of the virtual access point password will not result in uncontrolled network access by unauthorized communication devices. This reduces the potential network security and performance degradation risks that would ordinarily accompany the wide distribution of passwords.

In various embodiments, a network administrator may manage the authorization of a virtual access point password. Access to the wireless network may be made through a network access point to which the network administrator may have a connection. The connection may be through a local wireless connection to the network access point, for example, when the network administrator device is within range of the network access point. The connection between the network administrator device and the network access point may also be made through a remote connection to the Internet, for example, by a connection between the network administrator device and a cellular data connection to the Internet or through a access point connection to the Internet from a remote Wi-Fi network. The network administrator device may gain access to the network access point by connecting to a URL associated with the network access point, for example through a browser or other software. By connecting to the URL for the network access point, the network administrator device may be presented with an interface that will allow the network access point to be controlled and configured. The connection between the network administrator device and the network access point may allow the network administrator device to configure the network access point in a variety of ways. Alternatively, or in addition to, the network access point may be modified with software that allows for configuration of the network access point as further described herein.

In another embodiment, a virtual access point password may be created by the network access point and provided to the network administrator for relay to the guest. Additionally, the virtual access point may have its own identifier, such as an unpublished SSID or indexed SSID, that the guest device must use when accessing the network with the virtual access point password. The virtual access point identifier may be associated with the virtual access point password and the unique guest device ID in a database accessible to the virtual access point. Requiring a guest device to use a virtual access point identifier along with the virtual access point password may provide a further layer of security. In this embodiment, a guest's request to access the network may be made through a variety of mechanisms, such as through a text message from the guest device to the network administrator device, or through an arrangement discussed in advance. The request may be forwarded or unilaterally "pushed" by the network administrator device to the network access point. When the network access point receives the access request, a virtual access point may be instantiated or otherwise established. As part of this instantiation, a virtual access point identifier and virtual access point password for the virtual access point may be established. The virtual access point password will be different from the shared key or password for the network access point. By providing a virtual access point with a password different from the shared key for the network access point, the network administrator may maintain control over the distribution of the shared key, and provide access to guests without revealing the shared key.

When the virtual access point is instantiated or established, the network access point may forward the virtual access point identifier and the virtual access point password to the network administrator device. The network administrator device may forward the virtual access point identifier and the virtual access point password to the guest device such as in a text message. The network administrator device may also cause the virtual access point identifier and the virtual access point password to be displayed on the guest device so that the guest may then use the information to gain access to the wireless network. The guest device may enter the virtual access point identifier and the virtual access point password during a login or access procedure with the network access point, for example, when the guest device is within range of the network access point. During a first login procedure, the guest device ID may be obtained by the virtual access point and added to or stored in association with the database record storing the virtual access point password and the corresponding virtual access point identifier. Thereafter, when the guest device uses the virtual access point identifier to connect to the virtual access point that the guest device is permitted to access, the guest device sends the virtual access point password along with its device ID during a login procedure. If the virtual access point password and the device ID match the record associated with the virtual access point identifier, a secure connection is established between the virtual access point and the guest device.

Thus, the various embodiments enable provision and control of guest access to a secure network to be accomplished without providing guests with the network access point password. The guest may be provided with a dedicated password for the virtual access point, which may also be dedicated, for example, based on the virtual access point identifier. In various embodiments, the password for the virtual access point may be bound with a device identifier, such as a media access control (MAC) address, associated with the guest device. The combination of the MAC address and the virtual access point password may be added to an access list for the network access point. Thus, even if the password is disclosed to another, the password is not sharable with a user of a different communication device because any other communication device must also go through the remote administrator to request a virtual access point identifier and virtual access point password.

For sake of reference, a conventional wireless network with an access point configured for shared key security is described below with reference to FIGS. 1A-1C.

FIG. 1A illustrates an example 100, of a wireless network 103, such as a local area network (LAN), a wireless local area network (WLAN), or other network. The wireless network 103 may be a private network, such as a home network. The wireless network 103 may include a network access point 110 to provide wireless access through an antenna 111. The network access point 110 may also provide wired access to communication devices within the environment of the wireless network 103. The network access point 110 may be coupled through a connection 102 to the Internet 101, such as through a service provider (not shown). The wireless network 103 may also include a server 130, which may be coupled to the network access point 110 through a connection 130a. The connection 130a may be a wired or wireless connection. The server 130 may be coupled to other computers 133, to equipment such as a network printer 132, or other equipment that may be shared by computers that are coupled to the wireless network 103. A communication device 134, such as a television with a wireless capability may also be wirelessly connected to the network access point 110, for example, through a wireless connection 134a.

During operation of the network access point 110, one or more guest devices 120 may gain access to the wireless network 103 through the network access point 110 through connections 121, which may be wired or wireless connections. As mentioned above, guest devices 120 may be any of a variety of communication devices such as smartphones, laptop computing devices 102a, or other portable computing devices capable of making a wired or wireless connection to the network access point 110.

Figure 1B:
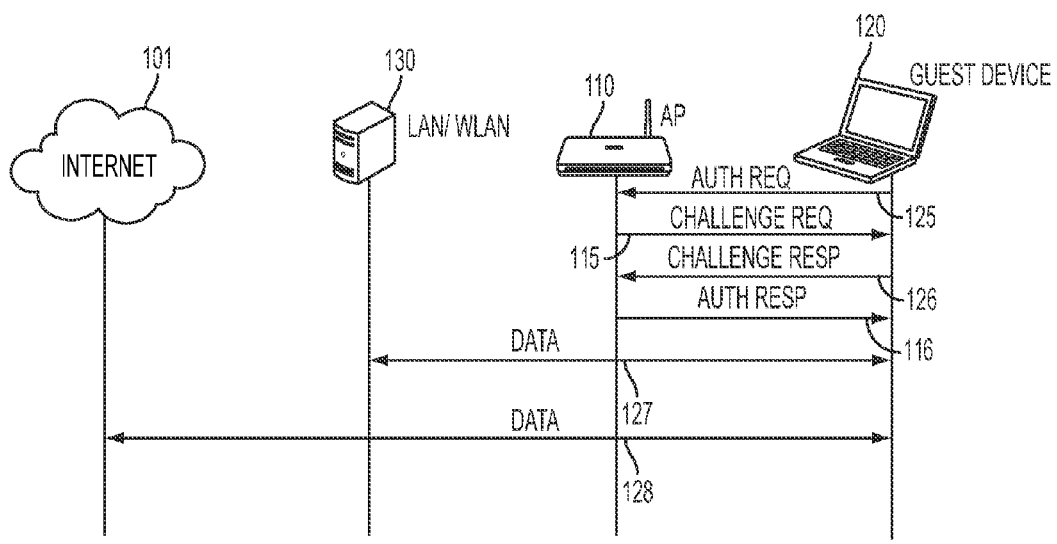
FIG. 1B is a message flow diagram illustrating access related messaging between an accessing device, an access point and one or more networks.
Figure 1C:
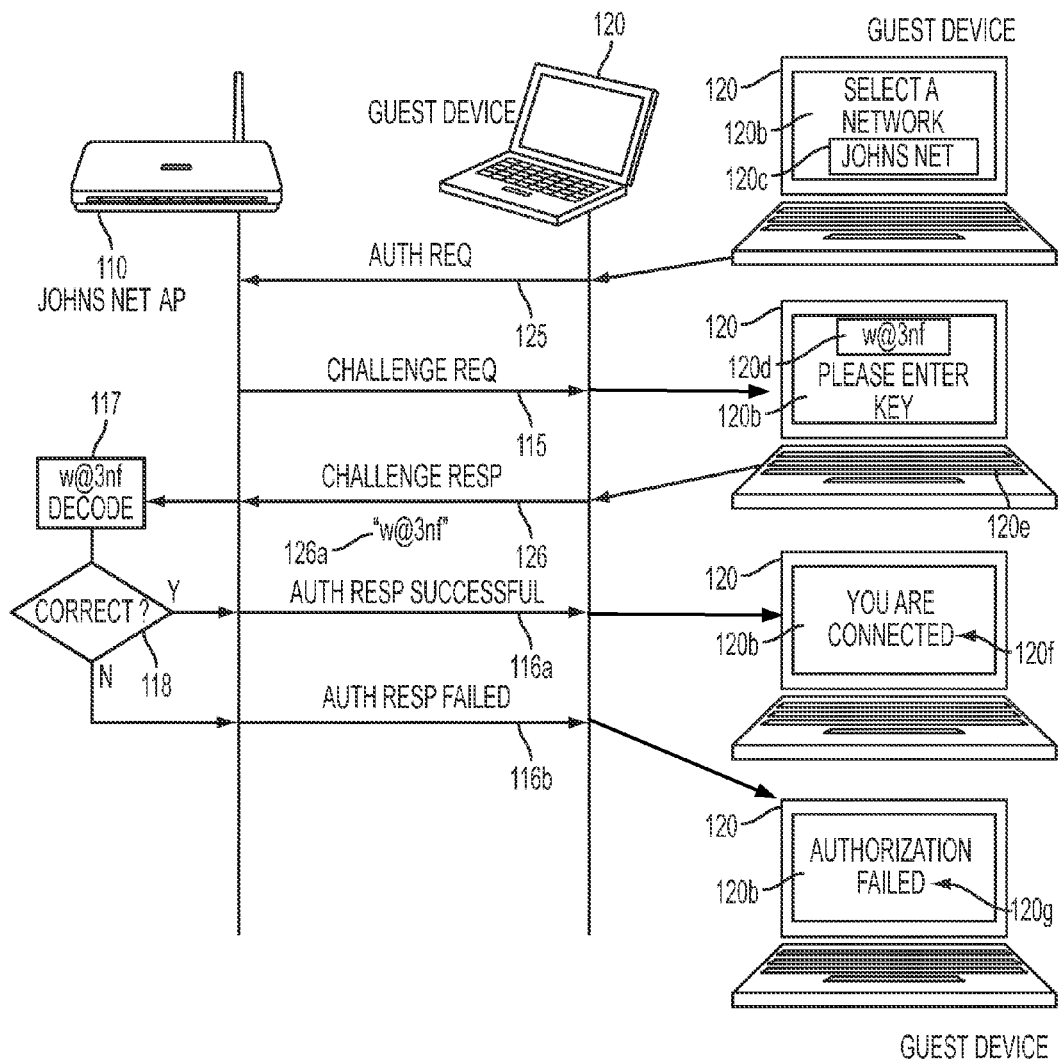
FIG. 1C is a message flow diagram with additional process flow blocks and user interface diagrams illustrating access related message flow, processes and example user interface messages and password or key entry screens during an example access attempt.

In order to gain access to the network access point 110, the guest devices 120 may conduct an access procedure at least a portion of which is illustrated in FIG. 1B. While one example access procedure may be associated with WiFi access, for example, under one of the 802.11 standards, other access procedures may also be used in various embodiments. After a communication device such as the guest device 120 has sent probe request frames within the radio environment of network access point 110 and the network access point 110 has responded with a probe response frame, the guest device may request access by sending an access request message 125 to the network access point 110. In an open access environment, any communication device that knows the service set identifier (SSID) of a network access point may gain access to the network. However, in a secure network, the guest device 120 must also enter a password in order to gain access to the wireless network 103. Therefore, the network access point 110 may respond to an access request message 125 with a challenge request message 115, which may be sent back to the guest device 120. Receipt of the challenge request message 115 may result in, for example, the display of a dialog or data entry screen for the guest device 120 prompting the guest to enter a network password. A challenge response message 126 including the network password may be sent to network access point 110. When the network password is correct, the network access point may send an authorization response message 116 to the guest device 120, at which point a secure connection may be established between the guest device 120 and the network through the network access point 110. For ease of description the above procedures and message flows are illustrated and may omit certain details, which may differ depending on the access protocol and specific hardware associated with the network access point 110, and the guest device 120. When a secure connection or association has been established between the guest device 120 and the network access point 110, a data connection 127 may be established, for example, through the network access point 110, with the network server 130 for the wireless network. The data connection 127 may allow the guest device 120 to have access to the server 130 and devices that may be coupled to the server 130. Further, a data connection 128 may be established through the network access point 110, to the Internet 101. The data connection 128 may allow the guest device to have access to the Internet 101 and any resources that are accessible through the Internet 101 including websites, web based email, and other resources accessible, for example, through universal resource locators (URLs).

A more detailed message flow exchange is illustrated in connection with FIG. 1C. In the present example, the guest device 120 may be a laptop computing device with a display 120b. When the guest device 120 sends a probe frame and finds the networks in the vicinity through probe response messages sent from the access points, a list of the available networks may be made available for selection. The user of the guest device 120 may select using the SSID, a network (e.g. "JOHNS NET") for access in an entry window 120c. The authorization request message 125 may contain the SSID for the selected network and may be sent to the network access point 110, which is associated with the "JOHNS NET" SSID. Based on being configured for secure access, the network access point 110, responsive to the authorization request message 125, may send a challenge request 115 to the guest device 120, which may result in the display of a dialog on the display 120b prompting for the entry of the shared key (e.g., "w@3nf"), for access to the network access point 110, which may be entered in an entry window 120d. A challenge response message 126 containing the shared key 126a "w@3nf" may be sent from the guest device 120 to the network access point 110. The network access point 110 may decode the shared key 126a in block 117. When the shared key is correct (e.g., decision block 118="YES"), an authorization response message 116a may be sent to the guest device 120 resulting in a message 120f on the display 120b indicating successful authorization or authentication and a data connection may be established. When the shared key is not correct (e.g., decision block 118="NO"), an authorization response message 116b may be sent to the guest device 120 resulting in a message 120g on the display 120b indicating failed authorization or authentication and a data connection may be refused. Thus, in order for a guest device 120 to access the network, the guest must be provided with the network password or shared key. As discussed above, this practice increases the risk of compromising the network.

Figure 2A:
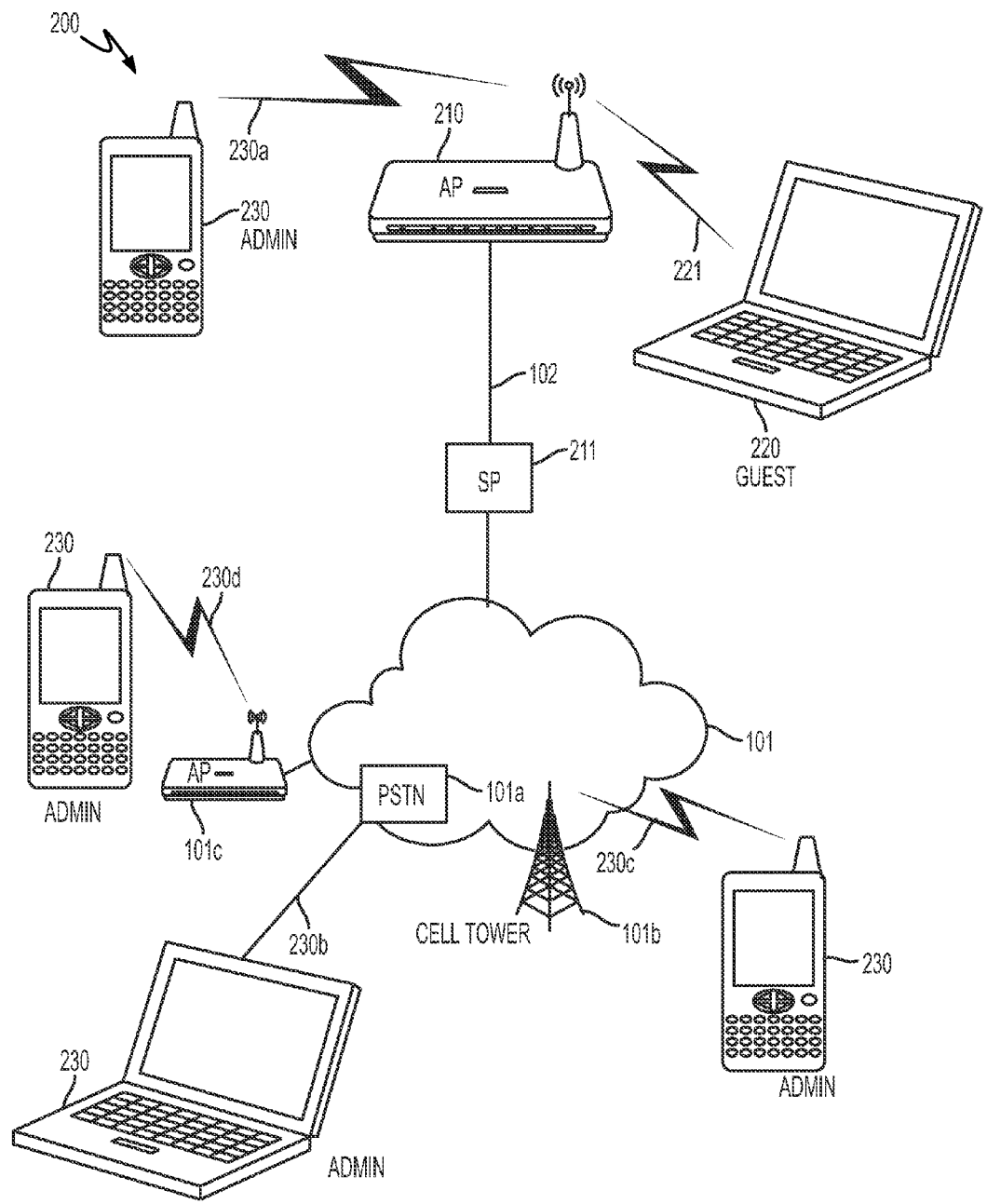
FIG. 2A is a communication system block diagram illustrating an example communication network including a network, an access point, an administrator device, and a guest device suitable for use with the various embodiments.

The various embodiments overcome the limitations of conventional access points by eliminating the need to distribute the shared key 126a in order to provide guest access by establishing a virtual access point that recognizes a virtual access point password, different from the shared key or network password, whose use is limited to a communication device having device ID associated with the virtual access point password. An example communication network 200 implementing the various embodiments is illustrated in FIG. 2A. In this system, a guest device 220 may be provided with access to a network through a network access point 210 when authorized by a network administrator device 230. The guest device 220 may establish a wireless communication link with the network access point 210 through a radio interface 221.

The network administrator device 230 may connect with the network access point 210 in a variety of ways so that guest access may be provided even when the network administrator device 230 is in a location remote from the network access point 210. For example, the network administrator device 230 may connect with the network access point 210 through a wireless connection 230*a* when within radio range of the network access point 210. In other examples, the network administrator device 230 may connect with the network access point 210 through a connection 230*b* to a public switched telephone network (PSTN) 101*a*, which may provide access to the Internet 101 using a modem connection or other subscriber line connection. In further examples, the network administrator device 230 may connect with the network access point 210 through a radio connection 230*c* to a cell tower 101*b*, which may also provide access to the Internet 101. In further examples, the network administrator device 230 may connect with the network access point 210 through a connection 230*d* to another access point 101*c*, which may also provide access to the Internet 101.

Figure 2B:
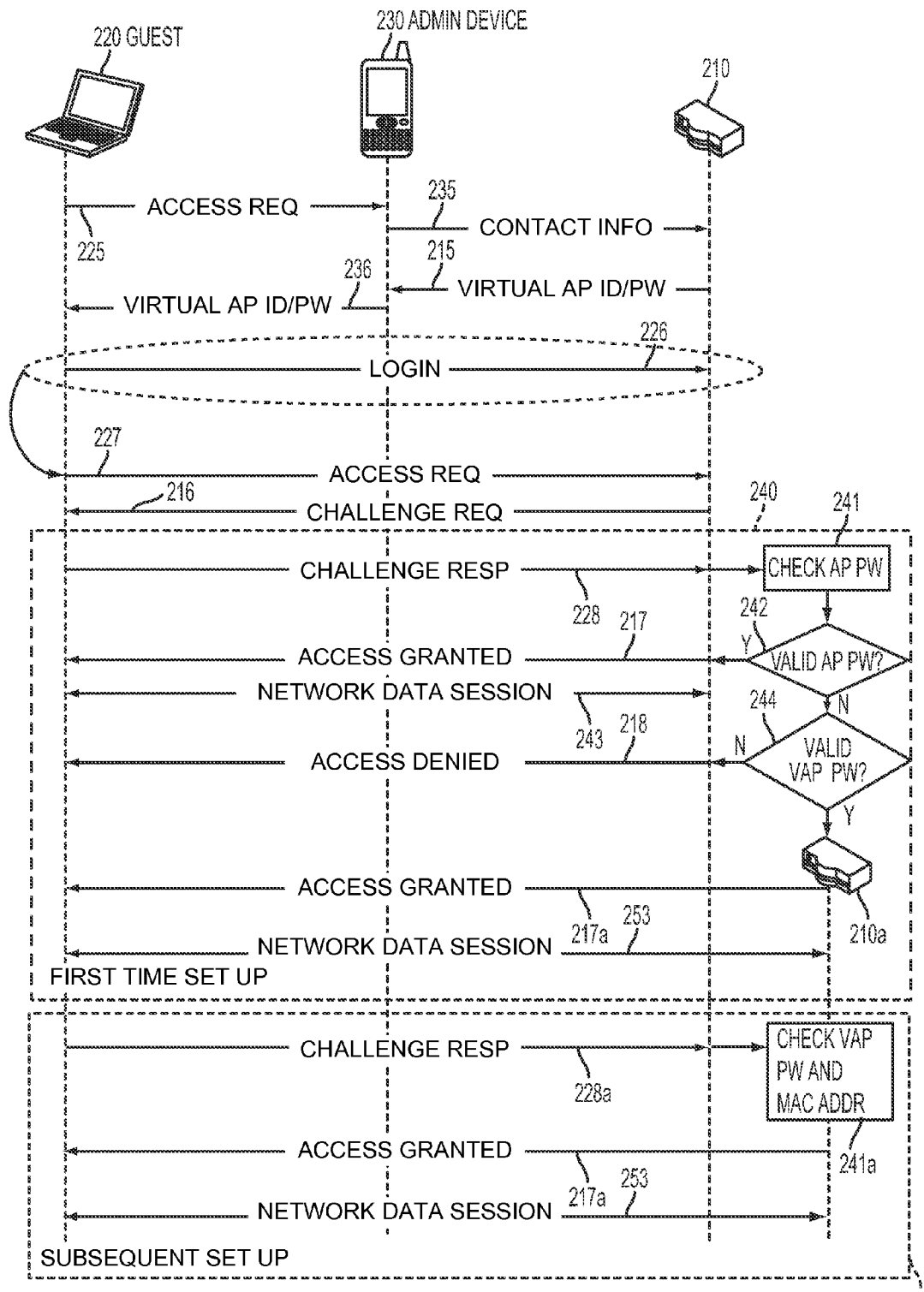
FIG. 2B is a message flow diagram illustrating an example message exchange between a guest device, a network administrator device, and an access point for providing guest access using a virtual access point according to an embodiment.

The network access point 210 may provide Internet 101 access through a service provider 211 and connection 102 to the communication devices supported by the network access point 210. The connection 102 through the service provider 211 may further allow communication devices to access the network access point 210 by entering the URL associated with the network access point 210. The network access point 210 may be protected from communication devices that can access the URL associated with the network access point 210 by requiring an administrator password. Thus, by accessing the network access point 210 locally through connection 230*a*, or remotely through connections 230*b*, 230*c*, 230*d* (or through other remote connections), the network administrator device 230 may enter the administrator password to configure the network access point 210. The network administrator device 230 may further conduct communications by which to provide access for guest device 220 as illustrated in FIG. 2B.

The guest device 220 may initiate a request 225 for access to the wireless network to which the network access point 210 may control access. The request 225 may include a request made in a text message to the user of the network administrator device 230, or may be made in a conversation established using guest device 220 and the network administrator device 230. The request may be part of a pre-arranged agreement to provide access made between the user of the guest device 220 and the user of the network administrator device 230.

Responsive to the request 225, the network administrator device 230 may provide information 235, such as contact information, to the network access point 210. The information 235 may function as a virtual device identifier that enables the network access point 210 to create an entry in an access list in order to establish access for the guest device 220 to the wireless network without necessarily knowing the unique device identifier of the guest device 220. The information 235 may also be used to generate a virtual device identifier. The virtual device identifier may be used during the first access attempt before the unique identifier has been obtained and bound with a virtual access point password. As discussed herein, the network access point 210 may instantiate or otherwise establish a virtual access point and virtual access point password. The virtual access point password may alternatively be instantiated during a discovery process. The discovery process may be a process in which the network access point determines a virtual identifier of the guest device 220 during a first access attempt. The discovery process may also be a process in which the network access point determines that a unique device identifier of the guest device 220 matches a stored identifier for the guest device 220 in subsequent accesses after the first access attempt. The unique identifier as described in greater detail herein, may be obtained during the first access attempt and used in subsequent access attempts to verify the identity of the guest device 220.

The virtual access point identifier and the virtual access point password may be stored along with the contact information passed in the information 235 in the access list with the network access point 210. The virtual access point identifier and the virtual access point password may be used for providing access to the guest device 220 during a subsequent access attempt. The virtual access point identifier and the virtual access point password may be forwarded to the guest device 220, so that the guest device 220 may gain access to the wireless network when the forwarded virtual access point identifier and virtual access point password values are entered.

The virtual access point identifier and the virtual access point password may be forwarded to the guest device 220 in an action 236 that may include sending the virtual access point identifier and the virtual access point password in a text message, which the user of the guest device 220 may read. The action 236 may also include displaying the virtual axis point identifier and the virtual access point password using a messaging software application other than text messaging. The messaging software application may allow messages to be passed between communication devices including a guest device 220 and the network administrator device 230. When the user of the guest device 220 or the guest device 220 is provided with the virtual access identifier and the virtual access point password, the guest device 220 may attempt a login 226 to the network access point 210. Depending on the type of protocol associated with the wireless network and the network access point 210, the login 226 process may include routine steps that are not shown, such as sending a probe request and receiving a probe response from any access point within range, including the network access point 210 as described above.

In a typical example, when the network access point 210 is "discovered" by the guest device 220, an access request message 227 may be sent by the guest device 220 to the network access point 210 based on an identification of the network access point by SSID. In other examples, the virtual access point may be independently discoverable by the virtual access point identifier, which may function as an SSID. The network access point 210, or the virtual access point acting through the network access point 210, may receive the access request message 227 and generate a challenge request message 216, which may be sent to the guest device 220. The challenge request message 216 may cause a dialog box or window to be displayed on a display associated with the guest device 220 requesting entry of a password for the network access point 210 or the virtual access point if identified by the guest device. The user of the guest device 220 may enter the virtual access point password in place of the network's normal password in the dialog box or window in order to gain access to the virtual access point, which may be instantiated on the network access point 210. In some embodiments, the challenge request message 216 may cause a custom dialog box or window to be displayed specifically requesting the network password and a virtual access point identifier associated with the access request. The entered information may be sent from the guest device 220 to the network access point 210 in a challenge response message 228 as a first message in an initial virtual access point set up sequence 240. The network access point 210 may check the received information in block 241.

In an example in which the user of the guest device has selected the SSID of the network access point 210, when the information received from the guest device includes the correct network password, such as the shared network key (i.e., determination block 242="Yes"), the network access point 210 may send an access granted message 217 and grant access to the wireless network through the network access point 210 according normal access procedures, thereby establishing a network data session 243. When the information received from the guest device does not include the correct network password (i.e., determination block 242="No"), the network access point 210 may perform several actions. In one example, the network access point 210 may be configured to pass the entered password to the virtual access point such that the virtual access point may determine whether the entered password and the device identifier information correspond to a valid guest. In other examples, the network access point 210, may pass the information from the guest device 220 to the virtual access point to determine whether the received information corresponds to or is recognized by a virtual access point supported by the network access point 210. When the information received from the guest device does not correspond to a virtual access point or information known to a virtual access point (i.e., determination block 244="No"), access for the guest device 220 may be denied and the network access point 210 may send an access denied message 218. When the information received from the guest device does correspond to a virtual access point or matches information in a record of database of authorized guest devices (e.g., a correct virtual access point password correlated device ID) (i.e., determination block 244="Yes"), access to a virtual access point 210a, which may be established or instantiated on the network access point 210, may be granted to the guest device 220 by sending an access granted message 217a. A network data session 253 may then be established between the guest device 220 and the virtual access point 210a.

During an initial access attempt by the guest device 220, access to the virtual access point 210a, which may be previously established or instantiated by the network access point 210 using the previously designated virtual access point identifier, may be granted based on the contact information is sent in message 235 described above. Such provisional access may be necessary because, while the device identifier of the guest device 220 may be available, until the guest device 220 is recognized as a device having the correct virtual access point identifier and the correct virtual access point password (e.g., or the correct contact information), the device identifier will not be bound or associated with the virtual access point password and/or virtual access point identifier.

When communicating with the network access point 210, a device identifier for the guest device 220 may be available within the communication frames passed from the guest device 220 to the network access point 210 prior to granting access. The device identifier for the guest device 220 may include a media access control (MAC) address or identifier, or may include a different identifier such as an IMEI identifier, or other identifier that is unique to the hardware associated with the guest device 220. During an initial access attempt, when the virtual access point password, the virtual access point identifier, contact information or other identifying information is determined to be correct, the device identifier and the virtual access point password may be bound or stored together with the virtual access point identifier in an access list or access database available to the network access point 210 and/or the virtual access point 210a (e.g., stored in memory of the network access point 210/virtual access point 210a, or in a server on a network to which the network access point 201/virtual access point 210a is connected).

During subsequent access attempts by the guest device 220 (i.e., after an initial or first time attempt) represented in FIG. 2B by access sequence 250, the guest device 220 may send a challenge response message 228a. In an example in which the virtual access point identifier is included in the challenge response message 228a, the virtual access point password and device identifier are received and processed in the virtual access point 210a. In another example, in which a virtual access point identifier is not provided, when the network access point 210 fails to recognize the virtual access point password (because it is not the network password) the access attempt and entered information, including the guest device identifier may be passed to the virtual access point 210a. The virtual access point 210a may check the virtual access point password and the device identifier (e.g., MAC address) of the guest device 220 such as by comparing the virtual access point password and the device identifier with data in an access list or access database in block 241a. Provided the virtual access point password and the device identifier match an entry in the access list/database, network access may be granted. When access is granted, the access granted message 217a may be sent to the guest device 220 and the network data session 253 established. Alternatively, the virtual access point 210a may recognize the device identifier associated with the guest device 220, and an automated association or access granting procedure may occur to grant access to the guest device 220 and a stored version of the virtual access point password. In an alternative example, the network access point 210 may be configured to recognize the device identifier of the guest device 220. The network access point 210 may pass the device identifier to the virtual access point 210a with the access request message 227 along with the stored virtual access point password provided by the guest device 220. When the virtual access point 210a recognizes the device identifier and the virtual access point password, access may automatically be granted to the guest device 220.

When contact information associated with the guest device 220 is sent to the network access point 210 and a virtual access point is established or instantiated, as described above, the network access point 210 may create an entry in a virtual access point table 301, an example of which is illustrated in FIG. 3A. The virtual access point table 301 may contain information associated with any established virtual access points that have been established or instantiated for providing guest access. Non-limiting and non-exhaustive examples of the columns of the virtual access point table 301 include a virtual access point index (e.g., identifier) column 310, a virtual access point name column 320, a virtual access point activity column 330, a virtual access point state column 340, a time restriction column 350, an access restriction column 360a, and a bandwidth restriction column 360b. Additional or fewer columns may be implemented in various embodiments.

The virtual access point index column 310 may include entries for virtual access points that may be established or instantiated by the network access point when a request for guest access is received. In some embodiments, the number of virtual access points associated with a given network or network access point may be limited, and a new guest access may be denied when the limit is reached. In the present example, five virtual access points are established based on five requests for guest access. A virtual access point index, such as an index 1 311, an index 2 312, an index 3 313, an index 4 314 and an index 5 315 may be established and be associated with the corresponding virtual access points. The virtual access point indexes may be provided to the guest device such that reference may be made to the virtual access point for the particular guest.

The virtual access points may further be assigned names (e.g. SSIDs) in the virtual access point name column 320, which may be used for gaining access, such as during a challenge response procedure. Virtual access point names, such as a "NEIGHBORS" name 321, a "JOHNSNET" name 322, a "PARENTS" name 323, a "KIDS" name 324, and a "JANESNET" name 325, may be assigned and associated with the corresponding virtual access points and for a given virtual access point, with other row entries for the given virtual access point, such as the corresponding virtual access point indexes.

The virtual access points may further be assigned an activity status in the virtual access point activity column 330, which may used for determining and updating the status activity of the associated virtual access points. Virtual access point activity status may include an ACTIVE status 331, an IDLE status 332, an ACTIVE status 333, an ACTIVE status 334, and an IDLE status 335, as well as other indicators of activity of the corresponding virtual access points. The activity status may indicate that a guest device has logged into and is associated with a virtual access point, or there is active data transfer occurring between the network access point and the guest device.

A state of the virtual access points may further be tracked and maintained in the virtual access point state column 340, which may be used to determine the access state for the virtual access point. Virtual access point states may be listed for the virtual access points, such as an OPEN state 341 for the virtual access point with the index 1 311, a BOUND state 342 for the virtual access point with the index 2 312, a BOUND state 343 for the virtual access point with the index 3 313, a BOUND state 344 for the virtual access point with the index 4 314, and a BOUND state 345 for the virtual access point with the index 5 315. The OPEN state 341 for the virtual access point with the index 1 311, may refer to a state where an access request has been made, a virtual access point has been established, but not yet accessed by a guest device. The BOUND states 342-345 for the virtual access points with the indexes 2 312 through 5 315, may refer to states where access has been made by a guest device having a device-specific identifier. The guest device identifier may be, for example, a MAC address, IMEI number, or other device-specific identifier of the communication device. The device identifier may be bound to the virtual access point password. The virtual access point password may be established when the virtual access point is established or instantiated and an index, identifier and/or name is established. The password and index and/or name for the virtual access point may be forwarded to the guest device so that the device identifier of the guest device may be learned during a first access attempt by the guest device. Thus, during subsequent accesses, the guest device may be identified with the associated virtual access point and the virtual access point password. Only that guest device may access the virtual access point because access is contingent on the correct virtual access point password being entered from a communication device having the device identifier bound to that virtual access point password.

Time restrictions may be designated in the virtual access point time restrictions column 350, which may be used to designate the allowable times or time windows that the guest device may access the virtual access point. Virtual access point allowable access times may be designated for each virtual access point, such as an 8 AM to 11 PM access time 351 for the virtual access point with the index 1 311, an 8 AM to 11 PM access time 352 for the virtual access point with the index 2 312, a NO RESTRICTIONS access time 353 for the virtual access point with the index 3 313, a 3 PM to 8 PM access time 354 for the virtual access point with the index 4 314, and a NO RESTRICTIONS access time 355 for the virtual access point with the index 5 315. When access is attempted by a guest device assigned for access to a particular virtual access point by a particular virtual access point index, identifier and/or name, the access times may be checked and access may be granted when access is attempted during the allowable time windows provided the correct password is entered from the guest device with the bound identifier. When no restrictions are designated (e.g., NO RESTRICTIONS), access may be attempted and granted at any time provided the correct password is entered from the guest device with the bound identifier. If access is attempted outside the times indicated by the time restrictions, access may be denied. In some embodiments, access outside the designated times may be approved by a network administrator.

Further restrictions on access to the virtual access points may be designated in the virtual access point access restrictions column 360a. Such access restrictions may be used to determine the allowable access to the network resources associated with the wireless network serviced by the virtual access point. Virtual access point access restrictions may be designated for each virtual access point, such as an EXTERNAL ONLY access restriction 361a for the virtual access point with the index 1 311, an EXTERNAL ONLY access restriction 362a for the virtual access point with the index 2 312, a NO RESTRICTIONS access restriction 363a for the virtual access point with the index 3 313, a NO RESTRICTIONS access restriction 364a for the virtual access point with the index 4 314, and a NO RESTRICTIONS access restriction 365a for the virtual access point with the index 5 315. The EXTERNAL ONLY access restrictions 361a and 362a may restrict access by the guest device to external network connections in order to prevent access to network resources that are "internal" to the network, such as printers, computers, and other devices that may form the private network associated with the premises where the wireless network is operating. For example, the EXTERNAL ONLY access restrictions 361a and 362a may limit access by the guest device to Internet access, which is available as an external resource to the network access point by a service provider. When access is attempted by a guest device assigned for access to a particular virtual access point by a particular virtual access point index, identifier and/or name, the access restrictions may be checked and access may be granted to network resources in accord with the corresponding restrictions. Attempts to access resources outside the indicated access restrictions may be denied. In some embodiments, access to restricted resources may be approved by a network administrator. The NO RESTRICTIONS access restrictions 363a-365a may allow guest devices to access all network resources. In the case of EXTERNAL ONLY and NO RESTRICTION, or other restriction levels, the system administrator may provide additional or special restrictions such as based on a user, device or file-specific restrictions that restrict access or restrict read/write capabilities as necessary for security and privacy purposes.

Further restrictions on access to the virtual access points may be designated in the virtual access point bandwidth restrictions column 360b. Bandwidth restrictions may be used to throttle or limit the bandwidth allocated to guest devices associated with the wireless network and serviced by the virtual access point. Virtual access point bandwidth restrictions may be designated for each virtual access point and may be based on priorities associated with the type of guest device, or by the identity or relationship of the guest to the owner or administrator of the wireless network. Bandwidth throttling may also be implemented on a dynamic basis. Dynamic bandwidth throttling would attempt to provide all guests with the maximum possible bandwidth. In a dynamic throttling example, bandwidth restrictions for guests would be implemented, if necessary, based on the current number of guests and the priority of guests, or based on a preset bandwidth allocation mechanism. In other words, maximum bandwidth would be allocated to guests while excess bandwidth is available. That is, until a number of guests increases to the point where excess bandwidth is no longer available, or bandwidth limits for the system begin to be approached or exceeded. When excess bandwidth is no longer available, the virtual access point may begin to restrict bandwidth based on a priority of the guest device with lower priority guest devices being restricted first. In other examples, bandwidth may be allocated at a pre-designated level when the guest device connects to the virtual access point.

Because all of the virtual access points are established and instantiated on the network access point hardware, and may use the same radio module, limitations on the bandwidth allocated to the guest devices may prevent the network and the network access point from becoming overloaded. Network overload may be particularly disadvantageous for high priority users such as the owner or administrator. Accordingly, when guests connect with a virtual access point, guest-specific bandwidth restrictions may be applied based on the virtual access point identifier. For example, a bandwidth restriction, such as a BW LVL 5 bandwidth restriction 361b for the virtual access point with the index 1 311 (e.g., corresponding to the virtual access point name NEIGHBORS 321), a BW LVL 1 bandwidth restriction 362b for the virtual access point with the index 2 312 (e.g., corresponding to the virtual access point name JOHNSNET 322), a FULL BW LVL 10 bandwidth restriction 363b for the virtual access point with the index 3 313 (e.g., corresponding to the virtual access point name PARENTS 323), a BW LVL 8 bandwidth restriction 364b for the virtual access point with the index 4 314 (e.g., corresponding to the virtual access point name KIDS 324), and a BW LVL 7 bandwidth restriction 365b for the virtual access point with the index 5 315 (e.g., corresponding to the virtual access point name JANESNET 325). The bandwidth restrictions 361b-365b may restrict bandwidth allocated to the guest device in order to prevent network access point and network overload. For example, the bandwidth restrictions 361b-365b may limit the bandwidth according to a "level," priority or other factor. In the present example a BW LVL 10 would represent full bandwidth and a BW LVL 1 would represent the more restricted bandwidth.

The bandwidth levels may be changed dynamically based on a variety of factors including activity level, available or excess bandwidth, bandwidth upgrades or other factors. In the present example, the virtual access point name JOHNSNET 322 for the virtual access point with the index 2 312, may be allocated the BW LVL 1, which is the lowest bandwidth allocation, based on the IDLE state 332. When the guest associated with the JOHNSNET 322 becomes active again, the bandwidth level may be increased or upgraded to an appropriate level. When the connection status of the guest devices changes, and, for example, an excess bandwidth condition develops, bandwidth levels may be increased or upgraded dynamically as appropriate.

In order to track the guest devices that are connected to the virtual access points, a further column may be provided, such as a DEVICE ID column 370a. The DEVICE ID column 370a may be used for maintaining an association or correspondence between a virtual access point and guest devices which have been bound to the virtual access point. For example, for the virtual access point with the index 1 311 (e.g., corresponding to the virtual access point name NEIGHBORS 321), a DEVICE ID 371a may contain an unknown address "??:??:??:??:??:??" because the binding state 341 for the virtual access point and the guest device is indicated as "OPEN." The OPEN state 341 means that the guest device has not yet performed a first log in to the virtual access point. For the virtual access point with the index 2 312 (e.g., corresponding to the virtual access point name JOHNSNET 322), a DEVICE ID 372a may contain a known address "12:34:56:78:9A:02" because the binding state 342 for the virtual access point and the guest device is indicated as "BOUND." The BOUND state 342, and other BOUND indications, means that the guest device has performed a first log in to the virtual access point and the virtual access point has recorded the device identifier, such as the MAC address, for the guest device. For the virtual access point with the index 3 313 (e.g., corresponding to the virtual access point name PARENTS 323), two DEVICE IDs 373a may contain known addresses "12:34:56:78:9A:00" and "12:34:56:78:9A:01" because the binding state 343 for the virtual access point and the guest devices is indicated as "BOUND." For the virtual access point with the index 4 314 (e.g., corresponding to the virtual access point name KIDS 324), two DEVICE IDs 374a may contain known addresses "12:34:56:78:9A:04" and "12:34:56:78:9A:05" because the binding state 344 for the virtual access point and the guest devices is indicated as "BOUND." For the virtual access point with the index 5 315 (e.g., corresponding to the virtual access point name JANESNET 325), a DEVICE ID 375a may contain known addresses "12:34:56:78:9A:03" because the binding state 345 for the virtual access point and the guest devices is indicated as "BOUND."

When a virtual access point is established or instantiated as described above, and a guest device subsequently attempts access, the network access point 210 may refer to a MAC Address user table 302, as illustrated in FIG. 3B. The MAC Address user table 302 may contain entries for the guest device identifiers that correspond to the virtual access points, and the name information of the guest associated with the guest devices. A DEVICE ID column 370b may contain an address "12:34:56:78:9A:00" 373b, an address "12:34:56:78:9A:01" 373c, an address "12:34:56:78:9A:02" 372b, an address "12:34:56:78:9A:04" 374b, an address "12:34:56:78:9A:05" 374c, an address "??:??:??:??:??:??" 371b, and an address "12:34:56:78:9A:03" 375b. The addresses in the DEVICE ID column 370b of the MAC address user table 302 may have some correspondence with the DEVICE ID column 370a in the virtual access point table 301 from FIG. 3A. In the MAC Address user table 302, the entries in the MAC Address column 370b having valid MAC address values may refer to MAC address values for guest devices that have attempted access and have had their virtual access point passwords bound with the MAC Address or device-specific identifier for the guest device and a virtual access point as identified, for example, by the virtual access point index. The address ??:??:??:??:??:?? 371b may refer to an unknown device identifier for a guest who has been assigned a virtual access point and a virtual access point password, but who has not attempted access to the virtual access point.

A virtual access point index column 380 may contain a virtual access point index 3 381 corresponding to the address 12:34:56:78:9A:00 373b, a virtual access point index 3 382 corresponding to the address 12:34:56:78:9A:01 373c, a virtual access point index 2 383 corresponding to the address 12:34:56:78:9A:02 372b, a virtual access point index 4 384 corresponding to the address 12:34:56:78:9A:04 374b, a virtual access point index 4 385 corresponding to the address 12:34:56:78:9A:05 374c, a virtual access point index 1 386 corresponding to the address ??:??:??:??:??:?? 371b, and a virtual access point index 5 387 corresponding to the address 12:34:56:78:9A:03 375b. In the present example, as can be seen from the virtual access point table 301 and the MAC Address user table 302, several guest devices may be associated with the same virtual access point.

In various embodiments, a guest name column 390 may contain name identifiers that may be assigned during the establishment of the virtual access point, such as based on the contact information sent during the request to establish guest access. The name identifiers may also be set or reset in other ways such as by the guest when access has been gained, or by the network administrator. The guest name column 390 may include a guest name "MOM" 391, a guest name "DAD" 391, a guest name "JOHN DOE" 393, a guest name "BOBBY PHONE" 394, a guest name "BOBBY LAPTOP" 395, a guest name "DALE NEIGHBOR" 396, and a guest name "JANE" 397. The guest name DALE NEIGHBOR 396 may be associated with an invalid or unassigned address such as the address ??:??:??:??:??:?? 371b. The address 371b, by not containing a valid address, may indicate that the guest associated with the guest name DALE NEIGHBOR 396 may not yet have attempted access. The other addresses 373b, 373c, 372b, 374b, 374c and 375b are associated with guest devices in which access has been attempted such that the device identifiers or MAC addresses are known.

Figure 3C:
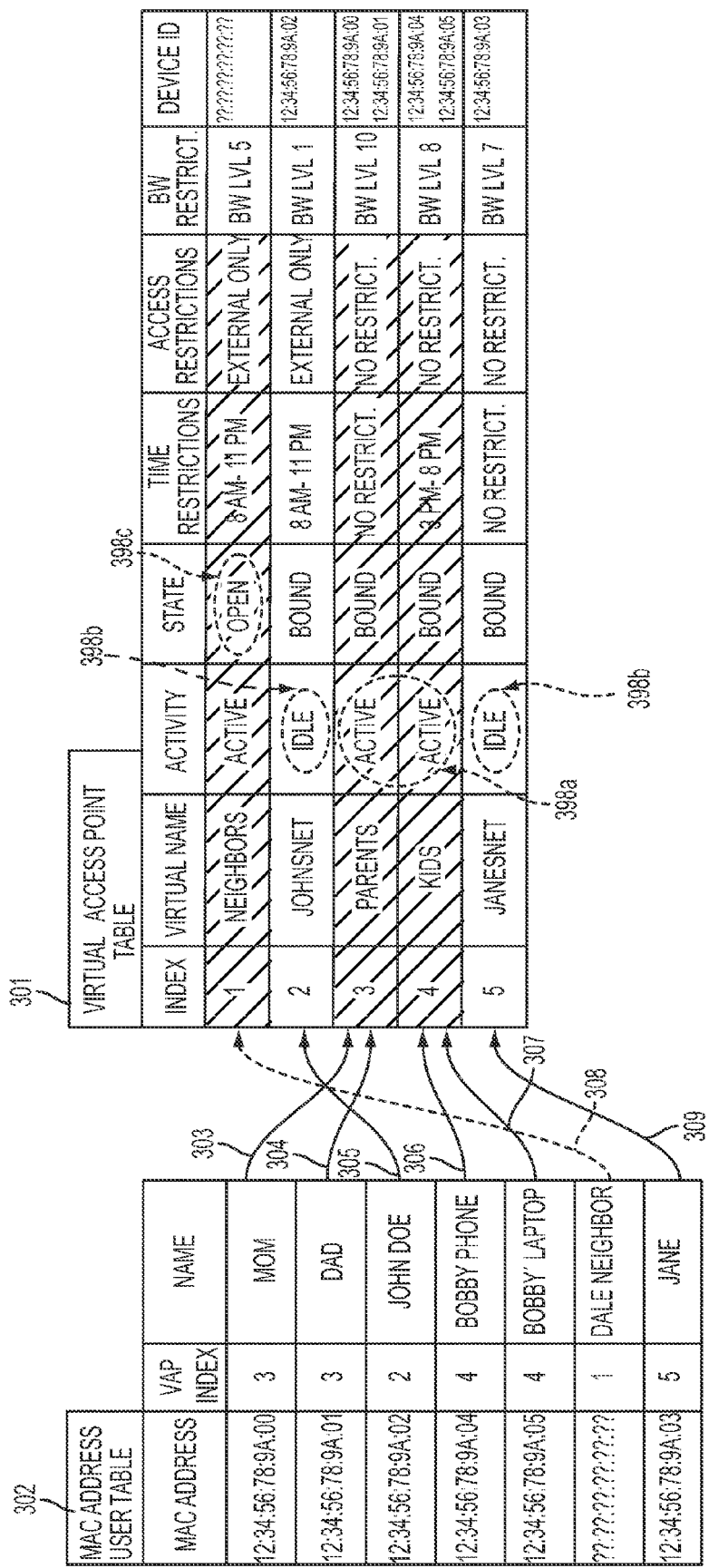
FIG. 3C is a table illustrating associations between virtual access point table parameters and MAC address user table parameters.

When requests for access are made and access is attempted by guest devices, the network access point may refer to and update various entries in the virtual access point table 301 and the MAC Address user table 302 based, for example, on associations between the virtual access point table 301 and the MAC Address user table 302. Associations between the virtual access point table 301 and the MAC Address user table 302 are illustrated in FIG. 3C. An association 303 between the MAC Address user table 302 and virtual access point table 301 shows that the guest device associated with the MOM name entry 391, the index 3 381 and the address 12:34:56:78:9A:00 371 in the MAC Address user table 302 may be associated with corresponding entries in the virtual access point table 301 for the index 3 313, the virtual access point name PARENTS 323, the activity status ACTIVE 333, the state BOUND 343, the time restriction NO RESTRICTIONS 353, and the access restrictions NO RESTRICTIONS 363. Similarly, an association 304 between the MAC Address user table 302 and virtual access point table 301 shows that the guest device associated with the DAD name entry 392, the index 3 382 and the address 12:34:56:78:9A:01 372 in the MAC Address user table 302 may be associated with corresponding entries in the virtual access point table 301 for the index 3 313, the virtual access point name PARENTS 323, the activity status ACTIVE 333, the state BOUND 343, the time restriction NO RESTRICTIONS 353, and the access restrictions NO RESTRICTIONS 363.

An association 305 between the MAC Address user table 302 and virtual access point table 301 shows that the guest device associated with the JOHN DOE name entry 393, the index 2 383 and the address 12:34:56:78:9A:02 372b in the MAC Address user table 302 may be associated with corresponding entries in the virtual access point table 301 for the index 2 312, the virtual access point name JOHNSNET 322, the activity status IDLE 332, the state BOUND 342, the time restriction 8 AM to 11 PM 352, the access restrictions EXTERNAL ONLY 362a, the bandwidth restrictions BW LVL 1 362b, and the DEVICE ID 12:34:56:78:9A:02 372a.

An association 306 between the MAC Address user table 302 and virtual access point table 301 shows that the guest device associated with the BOBBY PHONE name entry 394, the index 4 384 and the address 12:34:56:78:9A:04 374b in the MAC Address user table 302 may be associated with corresponding entries in the virtual access point table 301 for the index 4 314, the virtual access point name KIDS 324, the activity status ACTIVE 334, the state BOUND 344, the time restriction 3 PM to 8 PM 354, the access restrictions NO RESTRICTIONS 364a, the bandwidth restrictions BW LVL 8 364b, and one of the listed DEVICE IDs 374a, e.g., 12:34:56:78:9A:04. In an embodiment where "Bobby" has an additional communication device for gaining access to the network, the additional communication device may also be associated with the entries for the established virtual access point. For example, an association 307 between the MAC Address user table 302 and virtual access point table 301 shows that the guest device associated with the BOBBY LAPTOP name entry 395, the index 4 385 and the address 12:34:56:78:9A:05 374c in the MAC Address user table 302 may be associated with corresponding entries in the virtual access point table 301 for the index 4 314, the virtual access point name KIDS 324, the activity status ACTIVE 334, the state BOUND 344, the time restriction 3 PM to 8 PM 354, the access restrictions NO RESTRICTIONS 364a, the bandwidth restrictions BW LVL 8 364b, and another of the listed DEVICE IDs 374a, e.g., 12:34:56:78:9A:05.

When the network access point receives an access request, a decision may be taken as to whether to establish or instantiate a new virtual access point. The decision may be based on the utilization of the existing virtual access points and other factors. The network access point may further decide whether to assign the guest device associated with the request to an existing virtual access point. The entries 398a may indicate that both the guest devices associated with the MOM name entry 391 and the DAD name entry 392, and the guest devices associated with the BOBBY PHONE name entry 394 and the BOBBY LAPTOP name entry 395 have an activity status of ACTIVE (and a state of BOUND). By having an activity status of ACTIVE, a decision may be taken, for example, by the network access point to limit further guest access to the virtual access points identified by the index 3 313 and the index 4 314 because the bound guest devices are active.

The entries 398b may indicate that the guest device associated with the JOHN DOE name entry 393 and the guest device associated with the JANE name entry 397 are bound to established virtual access points (e.g., the index 2 312 and the index 5 315) and have an activity status of IDLE. By having an activity status of IDLE (e.g., and a state of BOUND), a decision may be taken, for example, by the network access point to allow further guest access to the virtual access points identified by the index 2 312 and the index 5 315 because the bound guest devices are idle.

The entry 398c may indicate that the guest device associated with the DALE NEIGHBOR name entry 396 is accessing an established virtual access point (e.g. the index 1 311) having a state of OPEN. By indicating the OPEN state, the network access point and/or the corresponding virtual access point will be attempting to obtain the device identifier 371a/371b for the guest device associated with the DALE NEIGHBOR name entry 396. When the device identifier 371a/371b, such as the MAC address of the guest device associated with the DALE NEIGHBOR 396 name entry, is obtained, the device identifier 371a/371b may be bound with the virtual access point password for the established virtual access point associated with the index 1 311. When a device identifier for the guest device and a virtual access point password are bound, only the guest device with the bound device identifier may gain access when the correct virtual access point password is entered or otherwise provided. Even when a guest device with a different device identifier enters the correct virtual access point password, the guest device will be denied access because the device identifier will not match the device identifier that is bound with the virtual access point password.

Binding may be the process of associating one value with another value such that reference to one bound value may be a reference to the other value to which the first value is bound. In one embodiment, in the present example, the device identifier may be a reference to the virtual access point password. In such an example, for example during access attempts that occur after binding, when the network access point and/or the virtual access point obtains the device identifier of the guest device, the device identifier may be used to reference the virtual access point password, which, for example, was previously successfully entered by the device, and access may be immediately granted. In other embodiments, the bound device identifier and virtual access point password may be stored in a table. When the guest device provides the virtual access point password, a lookup from the table may be performed to verify that a device with the correct device identifier is attempting to connect. The device identifier and the virtual access point password may be compared with the bound values from the lookup and the guest device may be allowed to access the virtual access point when the values match.

Figure 4A:
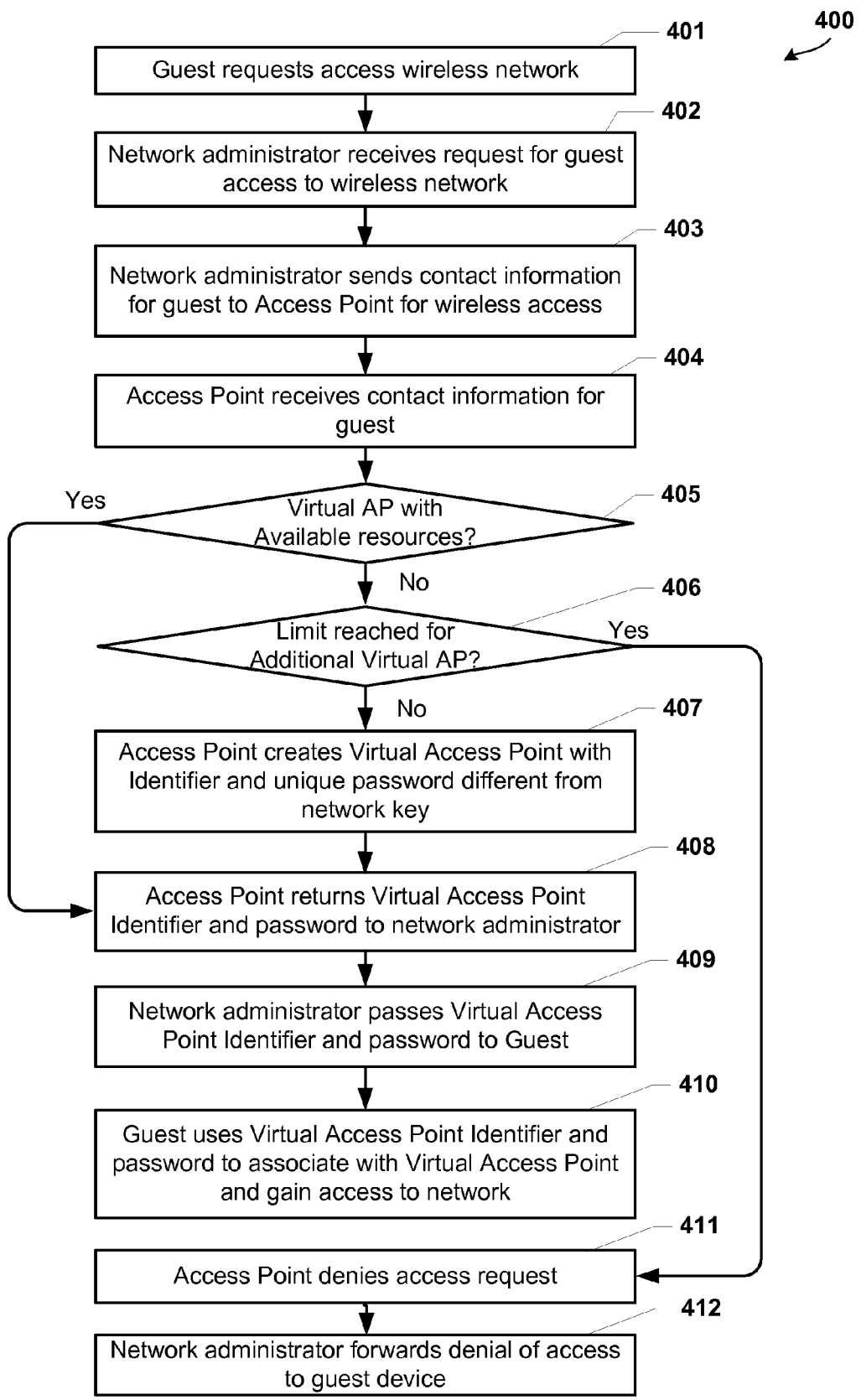
FIG. 4A is a process flow diagram illustrating an embodiment method of processing a request for guest access and establishing a virtual access point.

An embodiment method is illustrated in FIG. 4A for providing access to wireless network for a guest device by establishing a virtual access point. A guest may request access to a wireless network in block 401. Such a request may involve a message or other communication to a network administrator device. The network administrator device may receive the request for access to the wireless network from the guest device in block 402. The network administrator may send information to a network access point associated with access to the wireless network in block 403. The information may be, for example, contact information from a contact list associated with the network administrator device. If there is no contact information associated with the guest or owner of the guest device, the information may be added, for example, as a contact in the network administrator device and then sent.

The network access point may receive the contact information for the guest or owner of the guest device in block 404. When the network access point determines that one or more virtual access point has already been established and resources are available in the existing virtual access point (i.e., determination block 405="Yes"), the network access point may return a virtual access point index or identifier and a virtual access point password in block 408. When the network access point determines that no existing virtual access points have been created, or the resources of the existing virtual access points are insufficient to support an additional connection to a guest device (i.e., determination block 405="No"), further determinations may be made. For example, when the network access point checks a table of established virtual access points and determines that a limit on the number of virtual access points that can be established has not been met (i.e., determination block 406="No"), the network access point may create, instantiate or otherwise establish a virtual access point having a virtual access point index or identifier and a unique password in block 407. The unique password for the virtual access point may be different from the network password or shared key.

Creating or instantiating the virtual access point may involve starting a process that has logical and functional attributes of an access point. The virtual access point process may have access to hardware resources or may communicate with hardware through the main processes of the network access point, or under the control of the main processes of the network access point. When the virtual access point is created, instantiated or otherwise established, the network access point may return a virtual access point index or identifier and a virtual access point password in block 408.

When the virtual access point is created and/or when an identifier and password is returned to the network administrator device, the network administrator device may forward the virtual access point index or identifier and the virtual access point password to the guest or guest device in block 409. The guest device may then attempt to gain access to the network by using the virtual access point identifier and the virtual access point password to associate with the virtual access point.

When the limit for the creation of virtual access points is reached (i.e., determination block 406="Yes"), the network access point may deny the request for access in block 411. The denial may be forwarded or otherwise received by the network administrator device in response to the request made in block 403. The network administrator device may forward the denial for access to the guest or guest device in block 412.

The denial for access may be temporary, until additional resources are available on existing virtual access points. The network access point may terminate virtual access points under certain circumstances. For example, the network access point may terminate a virtual access point when all guests associated with the virtual access point have been idle for a period of time.

In various embodiments, the network access point may further monitor login activity associated with the virtual access points and may terminate the virtual access points when no guests associated with a virtual access point have logged in for a period of time. In alternative embodiments, the virtual access points themselves may monitor activity and terminate themselves under similar conditions. When virtual access point resources become available, or when virtual access points have been terminated, further requests may be granted. Thus, a guest or guest device may receive an indication, such as a message, that access has been denied. The message may contain a further notification that a request may be attempted again when resources are available. In various embodiments, the message may even contain a suggested time to retry the attempt for access. In other embodiments, the network administrator may automatically attempt access again at a later time and forward the virtual access point identifier and password when access is finally available.

Figure 4B:
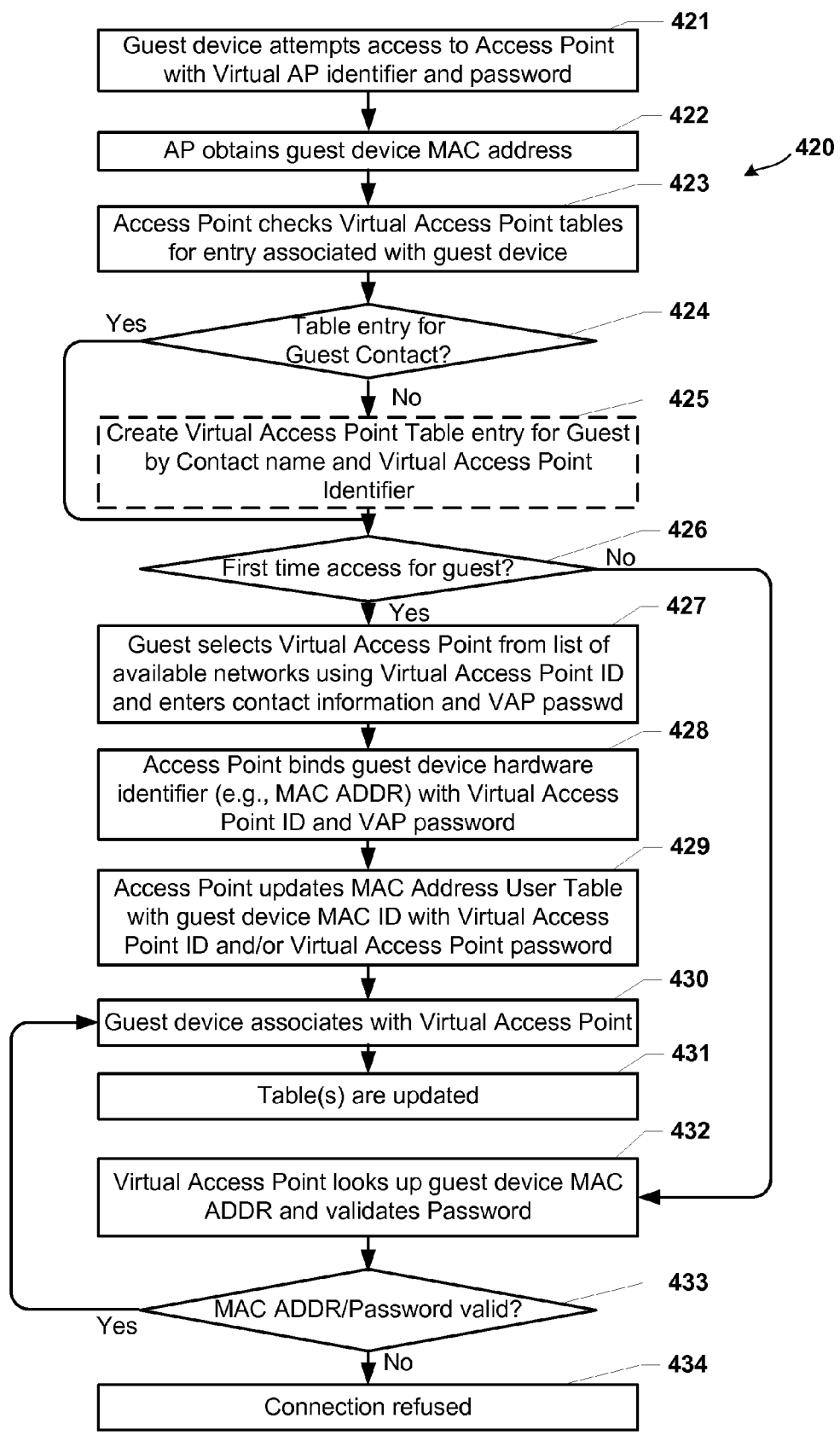
FIG. 4B is a process flow diagram illustrating an embodiment method of providing guest access using a virtual access point.

When the guest device receives a virtual access point index or identifier and a virtual access point password, the guest device may attempt access through an embodiment method 420 illustrated in FIG. 4B. The guest device may attempt access using the virtual access point identifier and the virtual access point password in block 421. The virtual access point index or identifier and the virtual access point password may be received from the network administrator as described above. The guest device, may make a device identifier known to the network access point when making initial discovery of the network access point. As mentioned above, the device identifier may be a MAC address, IMEI number, or other unique identifier of the communication device. The device identifier of the guest device may be made available through initial communications that may occur when the guest device comes within signal range of the network access point.

The initial communications may occur when the guest device responds to signals sent from the network access point to notify communication devices within radio communication range of the existence of the network access point and the capabilities of the network access point. Alternatively, similar communications may occur when a guest device attempts to make a wired connection to the network access point, such as when the guest device is coupled to the network access point hardware using a cable (e.g., RJ45 network cable, or similar cable). Such initial communications may include communications from the guest device to the network access point that contain the device identifier within protocol packets associated with the initial communications associated with a connection request. As part of a connection request procedure, such as in response to a challenge or a password request by the network access point, the guest device may enter the virtual access point identifier and the virtual access point password. When the correct virtual access point password is entered, the virtual access point may grant access to the network. As in the above examples, during a first access attempt, the guest device may enter contact information to verify the guest identity, whereupon the device identifier of the guest device can be ascertained and bound to the virtual access point password. During subsequent wired, or wireless access attempts, the guest device may be identified by the virtual access point based on the device identifier. For ease of description, the above described connection procedure is general in nature and may omit some details.

In example embodiments, the network access point may obtain the MAC address of the guest device in block 422. The network access point may check the virtual access point table and/or MAC address table for an entry associated with the guest device in block 423. In various embodiments, the check by the network access point may be made by a MAC address lookup operation. Alternatively or in addition, the check may be made by MAC address lookup and guest name and/or other information that is available in the virtual access point table or MAC address table. When a table entry for the guest contact (e.g., guest device) is not available (i.e., determination block 424="No"), a table entry may optionally be created in block 425. However, under usual circumstances, such as when a request has been made by, for example, a network administrator, as described herein, a table entry should be available and a virtual access point identifier assigned. Determination of the table entry may be based on the guest contact name, virtual access point identifier, and/or MAC address for the guest device. The table entry may contain at least guest contact information sufficient to identify the guest and the virtual access point index or identifier and the virtual access point password.

When a table entry is available (i.e., determination block 424="Yes"), the network access point may determine whether the guest device is attempting access for the first time. Such a determination may be possible when, for example, the MAC address table does not contain an entry for the device identifier or MAC address of the guest device. When the guest device is attempting to access the network for the first time (i.e., determination block 426="Yes"), a network corresponding to the virtual access point may be visible, for example, in the list of available networks to which the guest device can connect. While unbound guest users (e.g., guests who have not conducted a first-time login) are present in the user tables for the virtual access point identifier, the virtual access point may be configured to appear in lists of available networks for devices within range of the network access point. When all designated guest users are bound, the virtual access point may thereafter automatically connect the next time the guest device comes within range of the network access point.

The network access point may forward the contact information and virtual access point password to the proper virtual access point, for example, according to the virtual access point index or identifier provided by the guest device in block 427. In various embodiments, a virtual access point having the virtual access point index or identifier may have been previously instantiated or established, for example based on a request by the network administrator. When the virtual access point receives the contact information and virtual access point password from a guest making a first-time access, the network access point may bind the MAC address of the guest device to at least the virtual access point password and optionally to the virtual access point index or identifier in block 428. The network access point may update the entry in the MAC address user table corresponding to the guest device with the MAC address of the guest device. The guest device may then associate or otherwise connect to the virtual access point associated with the virtual access point index or identifier in block 430. The virtual access point table or tables may be updated to reflect information such as the connection status of guest device with the virtual access point, the state, and other information in block 431. In various embodiments, the virtual access point may consult the virtual access point tables to determine whether any time or access restrictions or other parameters are listed that may influence the network connection and scope of access for the guest device.

In subsequent access attempts, that is when the guest device is not attempting access the network for the first time (i.e., determination block 426="No"), the virtual access point indicated by the guest device may look up the MAC address of the guest device and validate the virtual access point password in block 432. Validation may be accomplished, for example, by comparing the entered virtual access point password and the MAC address of the guest device with a bound device identifier and virtual access point password stored in a table. When the MAC address and the virtual access point password cannot be validated (i.e., determination block 433="No"), the connection may be refused in block 434. When the MAC address and the virtual access point password are validated (i.e., determination block 433="Yes"), the guest device may be allowed to associate with the virtual access point in block 430. In another example, access may be granted by the virtual access point based solely on the device identifier, assuming that the proper virtual access point password was entered during the first access attempt for the device associated with the device identifier. In a further example, for a subsequent connection, a designated virtual access point that is fully bound but with no current guests associated may be instantiated when a device identifier of a bound guest device is recognized by the network access point. For example, the guest device identifier may be recognized from packet transmissions received by the network access point when the guest device comes within range of the network access point. Upon recognition that the device is in range, the virtual access point corresponding to the device identifier may be instantiated and access may be automatically granted.

Figure 5:
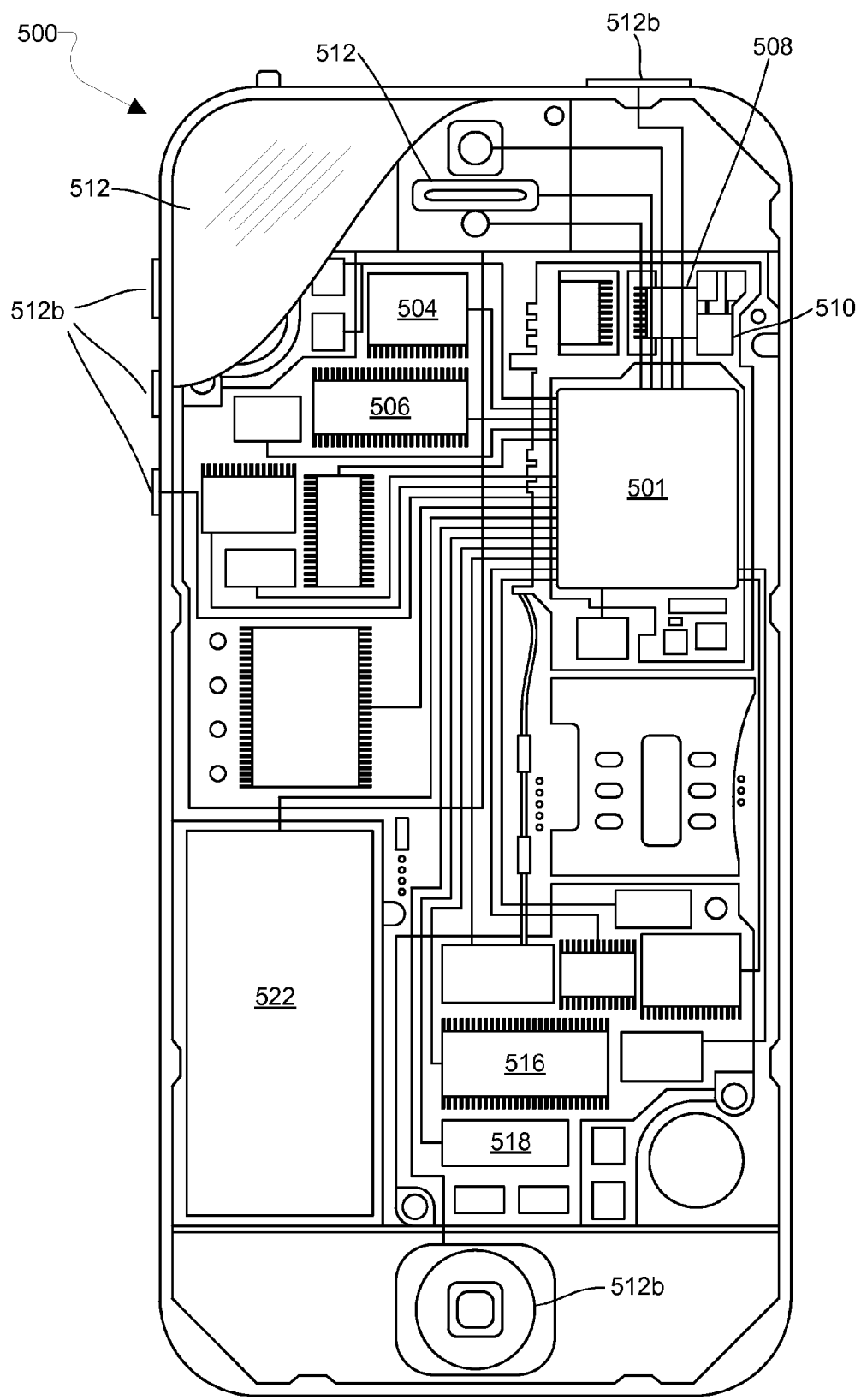
FIG. 5 is a block diagram illustrating an exemplary mobile device suitable for implementation of various embodiments.

The various embodiments may be implemented in and/or with any of a variety of computing devices, such as the mobile computing device 500 illustrated in FIG. 5. The mobile computing device 500 illustrated in FIG. 5 is only an example of a computing device that may be used with the various embodiments, and the components described below are illustrative in nature and may represent common components of any mobile computing device. Typical mobile computing devices 500 will have in common the components illustrated in FIG. 5. For example, mobile computing devices 500 may include a processor 501 coupled to internal memories 504 and 506 for storing information. Internal memories 504 and 506 may be volatile or non-volatile memories, and may also be secure and/or encrypted memories, or unsecure and/or unencrypted memories, or any combination thereof. The processor 501 may also be coupled to a touch screen display 512, such as a resistive-sensing touch screen, capacitive-sensing touch screen infrared sensing touch screen, or the like. In some embodiments, the display of the mobile computing devices 500 need not have touch screen capability.

Mobile computing devices 500 may have one or more radio signal transceivers 508 (e.g., Peanut®, Bluetooth®, Zigbee®, Wi-Fi, RF radio) and an antenna 510, or antenna module for coupling to an antenna device, for sending and receiving radio signals. The radio signal transceivers 508 may be coupled to each other and/or to the processor 501. Mobile computing devices 500 may include a cellular network wireless modem chip 516 that enables communication via a cellular data network (e.g., CDMA, TDMA, GSM, PCS, 3G, 4G, LTE, or any other type of cellular data network) and is coupled to the processor 501. Mobile computing devices 500 may include a peripheral device connection interface 518 coupled to the processor 501. The peripheral device connection interface 518 may be singularly configured to accept one type of connection, or multiply configured to accept various types of physical and communication connections, common or proprietary, such as USB, FireWire, Thunderbolt, or PCIe. The peripheral device connection interface 518 may also be coupled to a similarly configured peripheral device connection port. Mobile computing devices 500 may also include a speaker 514, or speakers, for providing audio outputs. Mobile computing devices 500 may also include a housing 520, constructed of a plastic, metal, or a combination of materials, for containing all or some of the components discussed herein. In some embodiments a physical antenna structure may be incorporated into the housing 520 and coupled to the antenna module 510. Mobile computing devices 500 may include a power source 522 coupled to the processor 501, such as a disposable or rechargeable battery. The rechargeable battery may also be coupled to the peripheral device connection port to receive a charging current from a source external to the mobile computing devices 500. Mobile computing devices 500 may also include a GPS receiver coupled to the processor 501 for determining locations of the device. Mobile computing devices 500 may also include physical buttons 512b for receiving user inputs.

Figure 6:
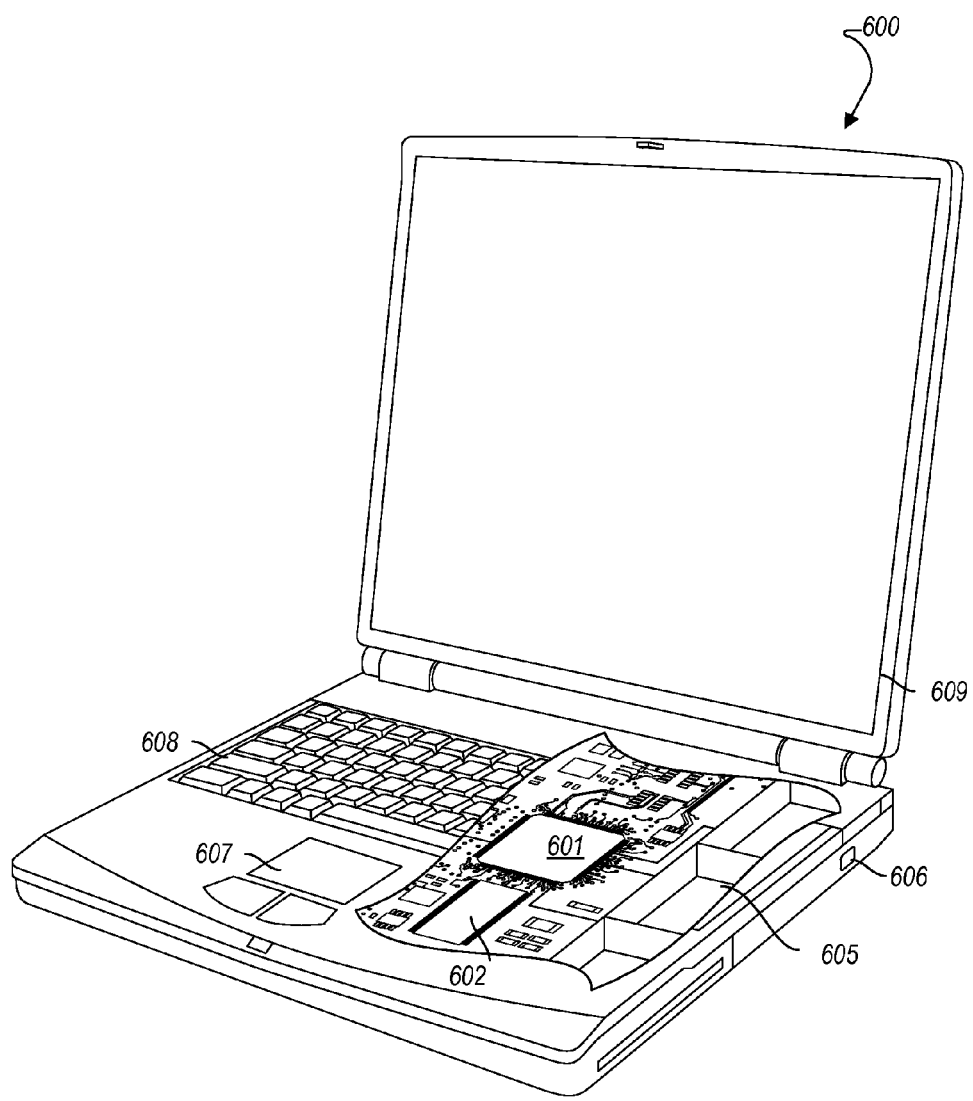
FIG. 6 is a block diagram illustrating an exemplary mobile computing device suitable for implementation of various embodiments.

The various embodiments described above may also be implemented within and/or with a variety of personal computing devices, such as a laptop computer 600 as illustrated in FIG. 6. Many laptop computers include a touch pad touch surface 607 that serves as the computer's pointing device, and thus may receive drag, scroll, and flick gestures similar to those implemented on mobile computing devices equipped with a touch screen display and described above. A laptop computer 600 will typically include a processor 601 coupled to volatile memory and a large capacity non-volatile memory, such as a flash memory device 602. The laptop computer 600 may also include a floppy disc drive and a compact disc (CD) drive coupled to the processor 601. The laptop computer 600 may also include a number of network transceivers or network connector ports 606 coupled to the processor 601 configured to enable the processor 602 to communicate with other computing devices one or more wired or wireless networks. As a particular example, the network transceivers of a laptop computer 600 may include Ethernet, USB or FireWire® connector sockets/transceivers, one or more wireless modem transceivers, such as Wi-Fi and/or cellular data network transceivers, coupled to one or more antenna for sending and receiving electromagnetic radiation. The laptop computer 600 may also include other types of network connection circuits for coupling the processor 601 to a network that may be developed in the future. In a notebook configuration, the computer housing 605 includes the touchpad 607, the keyboard 608, and the display 609 all coupled to the processor 601. Other configurations of the computing device may include a computer mouse or trackball coupled to the processor (e.g., via a USB input) as are well known, which may also be used in conjunction with the various embodiments.

The processors 501, 601 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor dedicated to wireless communication functions and one processor dedicated to running other applications. Typically, software applications may be stored in the internal memory 504, 506, 602 before they are accessed and loaded into the processor 501 and 601. The processor 501 and 601 may include internal memory sufficient to store the application software instructions and other information.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The functions in the various embodiments may be implemented in hardware, software, firmware, or any combination thereof. If implemented in software, the functions may be stored as one or more processor-executable instructions or code on a non-transitory computer-readable medium or non-transitory processor-readable medium. The steps of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the following claims and the principles and novel features disclosed herein.

What is claimed is:

1. A method of providing access to a wireless network through a network access point secured with a network password, the method comprising:
   receiving in the network access point a request to provide access to the wireless network for a guest device;
   establishing, by the network access point, a virtual access point to provide access to the wireless network for the guest device in response to receiving the request to provide access for the guest device;
   creating, by the network access point, a virtual access point password for the guest device that is associated with a unique device identifier of the guest device, wherein the virtual access point password is different from the network password, wherein the virtual access point password and the unique device identifier are each unique to only the guest device and the virtual access point for the network access point;
   limiting, by the network access point, use of the virtual access point password to gain access to the wireless network via the virtual access point to only the guest device by binding the virtual access point password with the unique device identifier of the guest device in a database accessible to the virtual access point; and
   providing the guest device with access to the wireless network when an entered password matches the virtual access point password and a guest device identifier of the guest device matches the unique device identifier of the guest device.

2. The method of claim 1, wherein the unique device identifier of the guest device includes a medium access control (MAC) address of the guest device.

3. The method of claim 1, wherein establishing the virtual access point comprises:
   determining whether a limit of available virtual access points has been reached; and
   establishing the virtual access point with a virtual access point identifier in response to determining that the limit of available virtual access points has not been reached.

4. The method of claim 1, wherein:
   the received request includes information associated with the guest device;
   creating the virtual access point password for the guest device comprises creating the virtual access point password for the guest device and associating the virtual access point password with a virtual identifier of the guest device based on the information associated with the guest device; and providing the guest device with access to the wireless network comprises providing provisional access to the wireless network during a first access attempt when the entered password matches the virtual access point password and the information associated with the guest device matches the virtual identifier of the guest device.

5. The method of claim 4, further comprising:

receiving in the network access point a second password from a second guest device for which access has not been requested and obtaining information associated with the second guest device in a second guest device access attempt;

determining whether the second password received from the second guest device matches either the network password of the network access point or the virtual access point password;

informing an administrator of the wireless network about the second guest device access attempt in response to recognizing that the second password received from the second guest device does not match the network password of the network access point or the virtual access point password;

receiving in the network access point a message from the administrator requesting the network access point to provide the second guest device with access to the wireless network;

creating, by the network access point, a second virtual access point password for the second guest device that is-associated with a second virtual identifier of the second guest device based on the information associated with the second guest device, wherein the second virtual access point password is different from the network password and from the virtual access point password for the guest device, wherein the second virtual access point password and the second virtual identifier are each unique to only the second guest device; and limiting, by the network access point, use of the second virtual access point password to gain access to the wireless network via the virtual access point to only the second guest device by binding the second virtual access point password with the second virtual identifier of the second guest device in the database.

6. The method of claim 4, further comprising:

establishing a virtual access point identifier associated with the virtual access point;

providing the virtual access point identifier and the virtual access point password to the guest device;

storing the virtual access point identifier and the virtual access point password in the database accessible to the virtual access point;

obtaining the unique device identifier of the guest device during the first access attempt by the guest device using the virtual access point identifier and the virtual access point password; and storing the unique device identifier of the guest device in association with the virtual access point identifier and the virtual access point password in the database accessible to the virtual access point, wherein, when the unique device identifier is obtained, providing the guest device with access to the wireless network comprises providing the guest device with access to the wireless network in subsequent access attempts when the guest device accesses the virtual access point using the virtual access point identifier, when the entered password matches the virtual access point password and when the guest device identifier of the guest device matches the unique device identifier of the guest device stored in association with the virtual access point password.

7. The method of claim 6, wherein establishing the virtual access point to provide access to the wireless network for the guest device in response to receiving the request to provide access for the guest device comprises:

establishing the virtual access point when the information associated with the guest device matches the virtual identifier of the guest device during the first access attempt; and establishing the virtual access point when the guest device identifier matches the unique device identifier of the guest device stored in association with the virtual access point password during subsequent access attempts after the first access attempt.

8. The method of claim 6, wherein:

establishing the virtual access point comprises establishing a restriction on access to the wireless network for the guest device; and providing the guest device with access to the wireless network in subsequent access attempts when the entered password matches the virtual access point password and the guest device identifier matches the unique device identifier of the guest device stored in association with the virtual access point password comprises providing the guest device with access to the wireless network subject to the restriction when the entered password matches the virtual access point password and the guest device identifier matches the unique device identifier of the guest device stored in association with the virtual access point password.

9. A network access point for providing access to a wireless network secured with a network password, the network access point comprising:

a processor configured to access processor readable instructions stored on a non-transitory computer readable medium to perform operations comprising:

receiving a request to provide access to the wireless network for a guest device;

establishing a virtual access point to provide access to the wireless network for the guest device in response to receiving the request to provide access for the guest device;

creating a virtual access point password for the guest device that is associated with a unique device identifier of the guest device, wherein the virtual access point password is different from the network password, wherein the virtual access point password and the unique device identifier are each unique to only the guest device and the virtual access point for the network access point;

limiting use of the virtual access point password to gain access to the wireless network via the virtual access point to only the guest device by binding the virtual access point password with the unique device identifier of the guest device in a database accessible to the virtual access point; and providing the guest device with access to the wireless network when an entered password matches the virtual access point password and a guest device identifier of the guest device matches the unique device identifier of the guest device.

10. The network access point of claim 9, wherein the processor is configured with processor-executable instructions to perform operations such that the unique device identifier of the guest device includes a medium access control (MAC) address of the guest device.

11. The network access point of claim 9, wherein the processor is configured with processor-executable instructions to perform operations such that establishing the virtual access point comprises:
    determining whether a limit of available virtual access points has been reached; and
    establishing the virtual access point with a virtual access point identifier in response to determining that the limit of available virtual access points has not been reached.

12. The network access point of claim 9, wherein:
    the received request includes information associated with the guest device;
    the processor is configured with processor executable instructions to perform operations such that:
        creating the virtual access point password for the guest device comprises creating the virtual access point password for the guest device and associating the virtual access point password with a virtual identifier of the guest device based on the information associated with the guest device; and
        providing the guest device with access to the wireless network comprises providing provisional access to the wireless network during a first access attempt when the entered password matches the virtual access point password and the information associated with the guest device matches the virtual identifier of the guest device.

13. The network access point of claim 12, wherein the processor is configured with processor-executable instructions to perform operations further comprising:
    receiving in the network access point a second password from a second guest device for which access has not been requested and obtaining information associated with the second guest device in a second guest device access attempt;
    determining whether the second password received from the second guest device matches either the network password of the network access point or the virtual access point password;
    informing an administrator of the wireless network about the second guest device access attempt in response to recognizing that the second password received from the guest device does not match the network password of the network access point or the virtual access point password;
    receiving in the network access point a message from the administrator requesting the network access point to provide the second guest device with access to the network;
    creating, by the network access point, a second virtual access point password for the second guest device that is associated with a second virtual identifier of the second guest device based on the information associated with the second guest device, wherein the second virtual access point password is different from the network password and from the virtual access point password for the guest device, wherein the second virtual access point password and the second virtual identifier are each unique to only the second guest device; and
    limiting use of the second virtual access point password to gain access to the wireless network via the virtual access point to only the second guest device by binding the second virtual access point password with the second virtual identifier of the second guest device in the database.

14. The network access point of claim 12, wherein the processor is configured with processor-executable instructions to perform operations further comprising:
    establishing a virtual access point identifier associated with the virtual access point;
    providing the virtual access point identifier and the virtual access point password to the guest device;
    storing the virtual access point identifier and the virtual access point password in the database accessible to the virtual access point;
    obtaining the unique device identifier of the guest device during the first access attempt by the guest device using the virtual access point identifier and the virtual access point password; and
    storing the unique device identifier of the guest device in association with the virtual access point identifier and the virtual access point password in the database accessible to the virtual access point,
    wherein the processor is configured with processor-executable instructions to perform operations when the unique device identifier is obtained such that providing the guest device with access to the wireless network comprises providing the guest device with access to the wireless network in subsequent access attempts when the guest device accesses the virtual access point using the virtual access point identifier, when the entered password matches the virtual access point password and when the guest device identifier of the guest device matches the unique device identifier of the guest device stored in association with the virtual access point password.

15. The network access point of claim 14, wherein the processor is configured with processor-executable instructions to perform operations such that establishing the virtual access point to provide access to the wireless network for the guest device in response to receiving the request to provide access for the guest device comprises:
    establishing the virtual access point when the information associated with the guest device matches the virtual identifier of the guest device during the first access attempt; and
    establishing the virtual access point when the guest device identifier matches the unique device identifier of the guest device stored in association with the virtual access point password during subsequent access attempts after the first access attempt.

16. The network access point of claim 14, wherein the processor is configured with processor-executable instructions to perform operations such that:
    establishing the virtual access point comprises establishing a restriction on access to the wireless network for the guest device; and
    providing the guest device with access to the wireless network in subsequent access attempts when the entered password matches the virtual access point password and the guest device identifier matches the unique device identifier of the guest device stored in association with the virtual access point password comprises providing the guest device with access to the wireless network subject to the restriction when the entered password matches the virtual access point password and the guest device identifier matches the unique device identifier of the guest device stored in association with the virtual access point password.

17. An apparatus for providing access to a wireless network through a network access point secured with a network password, the apparatus comprising:
means for receiving in the network access point a request to provide access to the wireless network for a guest device;
means for establishing, by the network access point, a virtual access point to provide access to the wireless network for the guest device in response to receiving the request to provide access for the guest device;
means for creating, by the network access point, a virtual access point password for the guest device that is associated with a unique device identifier of the guest device, wherein the virtual access point password is different from the network password, wherein the virtual access point password and the unique device identifier are each unique to only the guest device and the virtual access point for the network access point;
means for limiting, by the network access point, use of the virtual access point password to gain access to the wireless network via the virtual access point to only the guest device by binding the virtual access point password with the unique device identifier of the guest device in a database accessible to the virtual access point; and
means for providing the guest device with access to the wireless network when an entered password matches the virtual access point password and a guest device identifier matches the unique device identifier of the guest device.

18. The apparatus of claim 17, wherein the unique identifier of the guest device includes a medium access control (MAC) address of the guest device.

19. The apparatus of claim 17, wherein the means for establishing the virtual access point comprises:
means for determining whether a limit of available virtual access points has been reached; and
means for establishing the virtual access point with a virtual access point identifier in response to determining that the limit of available virtual access points has not been reached.

20. The apparatus of claim 17, wherein:
the received request includes information associated with the guest device;
the means for creating the virtual access point password for the guest device comprises means for creating the virtual access point password for the guest device and associating the virtual access point password with a virtual identifier of the guest device based on the information associated with the guest device; and
the means for providing the guest device with access to the wireless network comprises means for providing provisional access to the wireless network during a first access attempt when the entered password matches the virtual access point password and the information associated with the guest device matches the virtual identifier of the guest device.

21. The apparatus of claim 20, further comprising:
means for receiving in the network access point a second password from a second guest device for which access has not been requested and obtaining information associated with the second guest device in a second guest device access attempt;
means for determining whether the second password received from the second guest device matches either the network password of the network access point or the virtual access point password;
means for informing an administrator of the wireless network about the second guest device access attempt in response to recognizing that the second password received from the second guest device does not match the network password of the network access point or the virtual access point password;
means for receiving in the network access point a message from the administrator requesting the network access point to provide the second guest device with access to the wireless network;
means for creating, by the network access point, a second virtual access point password for the second guest device that is associated with a second virtual identifier of the second guest device based on the information associated with the second guest device, wherein the second virtual access point password is different from the network password and from the virtual access point password for the guest device, wherein the second virtual access point password and the second virtual identifier are each unique to only the second guest device; and
means for limiting use of the second virtual access point password to gain access to the wireless network via the virtual access point to only the second guest device by binding the second virtual access point password with the second virtual identifier of the second guest device in the database.

22. The apparatus of claim 20, further comprising:
means for establishing a virtual access point identifier associated with the virtual access point;
means for providing the virtual access point identifier and the virtual access point password to the guest device;
means for storing the virtual access point identifier and the virtual access point password in the database accessible to the virtual access point;
means for obtaining a unique device identifier of the guest device during the first access attempt by the guest device using the virtual access point identifier and the virtual access point password; and
means for storing the unique device identifier of the guest device in association with the virtual access point identifier and the virtual access point password in the database accessible to the virtual access point,
wherein the means for providing the guest device with access to the wireless network comprises means providing the guest device with access to the wireless network when the guest device accesses the virtual access point using the virtual access point identifier, when the entered password matches the virtual access point password and when the guest device identifier matches the unique device identifier of the guest device stored in association with the virtual access point password.

23. The apparatus of claim 22, wherein the means for establishing the virtual access point to provide access to the wireless network for the guest device in response to receiving the request to provide access to the wireless network comprises:
means for establishing the virtual access point when the information associated with the guest device matches the virtual identifier of the guest device during the first access attempt; and
means for establishing the virtual access point when the guest device identifier matches the unique device identifier of the guest device stored in association with the virtual access point password during subsequent access attempts after the first access attempt.

24. The apparatus of claim 22, wherein:
the means for establishing the virtual access point comprises means for establishing a restriction on access to the wireless network for the guest device; and
the means for providing the guest device with access to the wireless network in subsequent access attempts when the entered password matches the virtual access point password and the guest device identifier matches the unique identifier of the guest device stored in association with the virtual access point password comprises means for providing the guest device with access to the wireless network subject to the restriction when the entered password matches the virtual access point password and the guest device identifier matches the unique device identifier of the guest device stored in association with the virtual access point password.

25. A non-transitory computer readable medium having stored thereon processor-executable instructions configured to cause a processor to perform operations comprising:
receiving in a network access point a request to provide access to a wireless network for a guest device;
establishing, by the network access point, a virtual access point to provide access to the wireless network for the guest device in response to receiving the request to provide access for the guest device;
establishing creating, by the network access point, a virtual access point password for the guest device that is associated with a unique device identifier of the guest device, wherein the
virtual access point password is different from the network password, wherein the virtual access point password and the unique device identifier are each unique to only the guest device and the virtual access point for the network access point;
limiting, by the network access point, use of the virtual access point password to gain access to the wireless network via the virtual access point to only the guest device by binding the virtual access point password with the unique device identifier of the guest device in a database accessible to the virtual access point; and
providing the guest device with access to the wireless network when an entered password matches the virtual access point password and a guest device identifier of the guest device matches the unique device identifier of the guest device.

26. The non-transitory computer readable medium of claim 25, wherein:
the received request includes information associated with the guest device;
the stored processor executable instructions are configured to cause the processor to perform operations such that:
creating the virtual access point password for the guest device comprises creating the virtual access point password for the guest device and associating the virtual access point password with a virtual identifier of the guest device based on the information associated with the guest device; and
providing the guest device with access to the wireless network comprises providing provisional access to the wireless network during a first access attempt when the entered password matches the virtual access point password and the information associated with the guest device matches the virtual identifier of the guest device.

27. The non-transitory computer readable medium of claim 26, wherein the stored processor-executable instructions are configured to cause the processor to perform operations further comprising:
receiving in the network access point a second password from a second guest device for which access has not been requested and obtaining information associated with the second guest device in a second guest device access attempt;
determining whether the second password received from the second guest device matches either the network password of the network access point or the virtual access point password;
informing an administrator of the wireless network about the second guest device access attempt in response to recognizing that the second password received from the second guest device does not match the network password of the network access point or the virtual access point password;
receiving in the network access point a message from the administrator requesting the network access point to provide the second guest device with access to the wireless network;
creating, by the network access point, a second virtual access point password for the second guest device that is associated with a second virtual identifier of the second guest device based on the information associated with the second guest device, wherein the second virtual access point password is different from the network password and from the virtual access point password for the guest device, wherein the second virtual access point password and the second virtual identifier are each unique to only the second guest device; and
limiting, by the network access point, use of the second virtual access point password to gain access to the wireless network via the virtual access point to only the second guest device by binding the second virtual access point password with the second virtual identifier of the second guest device in the database.

28. The non-transitory computer readable medium of claim 26, wherein the stored processor-executable are configured to cause the processor to perform operations further comprising:
establishing a virtual access point identifier associated with the virtual access point;
providing the virtual access point identifier and the virtual access point password to the guest device;
storing the virtual access point identifier and the virtual access point password in the database accessible to the virtual access point;
obtaining the unique device identifier of the guest device during the first access attempt by the guest device using the virtual access point identifier and the virtual access point password; and
storing the unique device identifier of the guest device in association with the virtual access point identifier and the virtual access point password in the database accessible to the virtual access point,
wherein the stored processor-executable are configured to cause a processor to perform operations when the unique device identifier is obtained such that providing the guest device with access to the wireless network comprises providing the guest device with access to the wireless network in subsequent access attempts when the guest device accesses the virtual access point using the virtual access point identifier, when the entered password matches the virtual access point password and when the guest device identifier of the guest device matches the unique device identifier of the guest device stored in association with the virtual access point password.

29. The non-transitory computer readable medium of claim 28, wherein the stored processor-executable instructions are configured to cause the processor to perform operations such that establishing the virtual access point to provide access to the wireless network for the guest device in response to receiving the request to provide access for the guest device comprises:
- establishing the virtual access point when the information associated with the guest device matches the virtual identifier of the guest device during the first access attempt; and
- establishing the virtual access point when the guest device identifier matches the unique device identifier of the guest device stored in association with the virtual access point password during subsequent access attempts after the first access attempt.

30. The non-transitory computer readable medium of claim 28, wherein the stored processor-executable instructions are configured to cause the processor to perform operations such that:
- establishing the virtual access point comprises establishing a restriction on access to the wireless network for the guest device; and
- providing the guest device with access to the wireless network in subsequent access attempts when the entered password matches the virtual access point password and the guest device identifier matches the unique device identifier of the guest device stored in association with the virtual access point password comprises providing the guest device with access to the wireless network subject to the restriction when the entered password matches the virtual access point password and the guest device identifier matches the unique device identifier of the guest device stored in association with the virtual access point password.

* * * * *